(12) United States Patent
Saito

(10) Patent No.: US 12,062,362 B2
(45) Date of Patent: Aug. 13, 2024

(54) INFORMATION PROCESSING DEVICE, INFORMATION PROCESSING SYSTEM, AND INFORMATION PROCESSING METHOD

(71) Applicant: SONY CORPORATION, Tokyo (JP)

(72) Inventor: Mari Saito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 687 days.

(21) Appl. No.: 17/250,367

(22) PCT Filed: May 29, 2019

(86) PCT No.: PCT/JP2019/021306
§ 371 (c)(1),
(2) Date: Jan. 11, 2021

(87) PCT Pub. No.: WO2020/017166
PCT Pub. Date: Jan. 23, 2020

(65) Prior Publication Data
US 2021/0134272 A1    May 6, 2021

(30) Foreign Application Priority Data

Jul. 20, 2018   (JP) ................................. 2018-136672

(51) Int. Cl.
*G10L 15/10*    (2006.01)
*G10L 15/06*    (2013.01)

(52) U.S. Cl.
CPC ............ *G10L 15/10* (2013.01); *G10L 15/063* (2013.01)

(58) Field of Classification Search
CPC ........ G10L 15/10; G10L 15/063; G06F 3/167
See application file for complete search history.

(56) References Cited

U.S. PATENT DOCUMENTS 10,872,599 B1 *  12/2020  Wu .......................... G10L 15/08
10,950,236 B1 *  3/2021   Stekkelpak ......... G10L 15/1815
(Continued)

FOREIGN PATENT DOCUMENTS

CN        104169837 A     11/2014
JP        2003-323192 A   11/2003
(Continued)

OTHER PUBLICATIONS

International Search Report and Written Opinion of PCT Application No. PCT/JP2019/021306, issued on Jul. 16, 2019, 06 pages of ISRWO.

*Primary Examiner* — Daniel C Washburn
*Assistant Examiner* — Athar N Pasha
(74) *Attorney, Agent, or Firm* — CHIP LAW GROUP

(57) ABSTRACT

Provided is a limited utterance determination unit that determines whether or not a user utterance is a limited utterance among one or more pre-registered limited utterances, a risk determination unit that, in the case where the result of the determination is that the user utterance is not any one of the one or more pre-registered limited utterances, determines a risk of a process corresponding to the user utterance, and a process execution unit that, in the case where the risk of the process corresponding to the user utterance is not a low risk, outputs a guidance that prompts a user to make a limited utterance included in the pre-registered limited utterances are provided. In the case where the risk is not the low risk, the process execution unit outputs an alert including explanation information regarding the risk.

18 Claims, 18 Drawing Sheets

(56) References Cited

U.S. PATENT DOCUMENTS

| | | | |
|---|---|---|---|
| 2007/0033005 A1* | 2/2007 | Cristo | G10L 15/19 |
| | | | 704/9 |
| 2014/0288931 A1 | 9/2014 | Cho et al. | |
| 2015/0154954 A1* | 6/2015 | Sharifi | G10L 15/22 |
| | | | 704/251 |
| 2019/0066680 A1* | 2/2019 | Woo | G10L 15/08 |
| 2019/0074003 A1* | 3/2019 | Guthery | G10L 15/02 |
| 2019/0087152 A1* | 3/2019 | Aggarwal | G06F 9/453 |
| 2019/0332668 A1* | 10/2019 | Wang | G06N 3/047 |
| 2020/0012745 A1* | 1/2020 | Bain | H04L 9/0822 |

FOREIGN PATENT DOCUMENTS

| | | |
|---|---|---|
| JP | 2005-099944 A | 4/2005 |
| JP | 2015-215433 A | 12/2015 |
| WO | 2013/122310 A1 | 8/2013 |

\* cited by examiner

F I G. 1
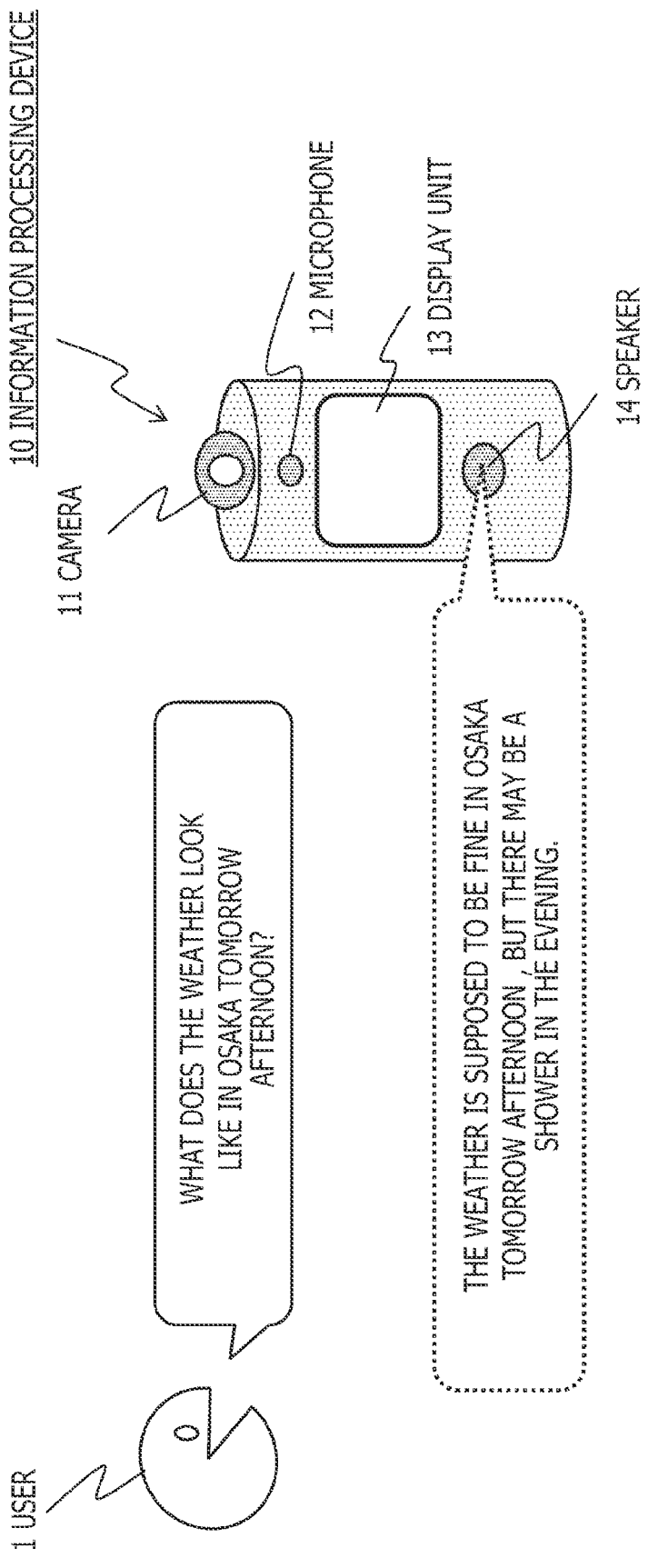

FIG. 5

| | USER UTTERANCE TEXT (SPEECH RECOGNITION RESULT) | TAG |
|---|---|---|
| (1) | TAKE A PHOTOGRAPH | Limited |
| (2) | SEND AN EMAIL | Limited |
| (3) | SHOW ME THE SCHEDULE | Limited |
| (4) | TELL ME THE WEATHER FORECAST | Limited |
| (5) | TURN ON THE LIGHT | Limited |
| : | : | : |

FIG. 6

| | KIND OF PROCESS | RISK LEVEL |
|---|---|---|
| (11) | TAKING A PHOTOGRAPH | HIGH RISK |
| (12) | SENDING A PHOTOGRAPH TO OUTSIDE (SERVER, ETC.) | HIGH RISK |
| (13) | SENDING CONVERSATION AS MESSAGE | HIGH RISK |
| (14) | PLAYING MUSIC AT LOUD VOLUME | HIGH RISK |
| (21) | INPUTTING SCHEDULE | MIDDLE RISK |
| (22) | PLAYING MUSIC | MIDDLE RISK |
| : | : | : |
| (31) | OUTPUTTING WEATHER INFORMATION | LOW RISK |
| (32) | RUNNING PHOTO SLIDESHOW | LOW RISK |
| : | : | : |

F I G . 1 6

| | USER ID | USER UTTERANCE TEXT (SPEECH RECOGNITION RESULT) | TAG |
|---|---|---|---|
| (1 1) | — | TAKE A PHOTOGRAPH | Limited |
| (1 2) | u001 | A PHOTOGRAPH, PLEASE | Limited |
| ‥ | ‥ | ‥ | ‥ |
| (2 1) | — | SEND AN EMAIL | Limited |
| (2 2) | u002 | SEND A LETTER | Limited |
| ‥ | ‥ | ‥ | ‥ |

(1 2) ADDED BY LEARNING PROCESS (2 2) ADDED BY LEARNING PROCESS

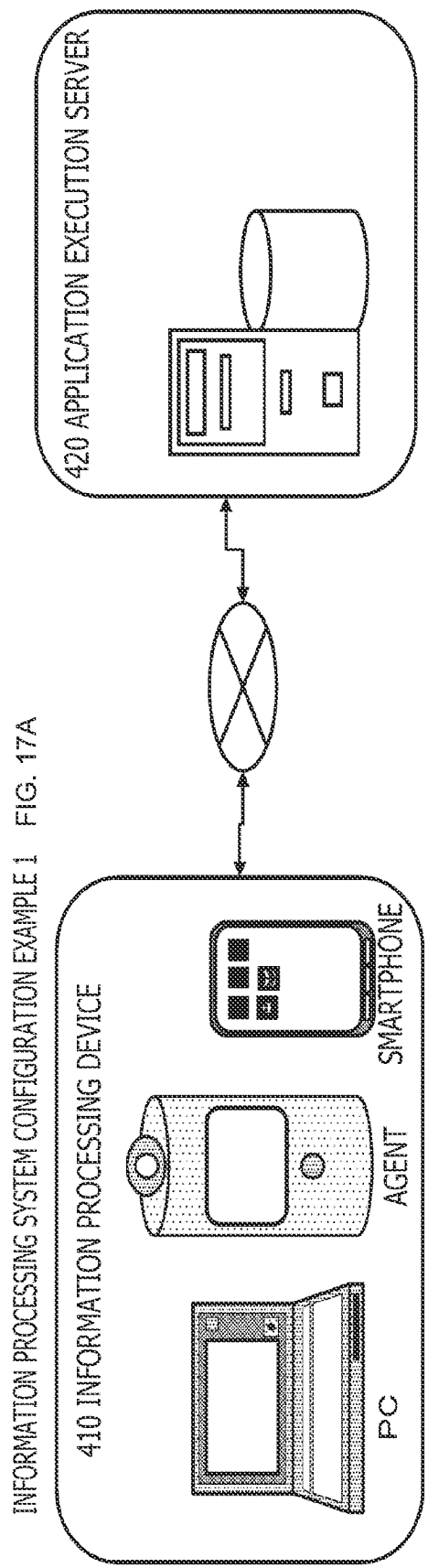
INFORMATION PROCESSING SYSTEM CONFIGURATION EXAMPLE 1    FIG. 17A
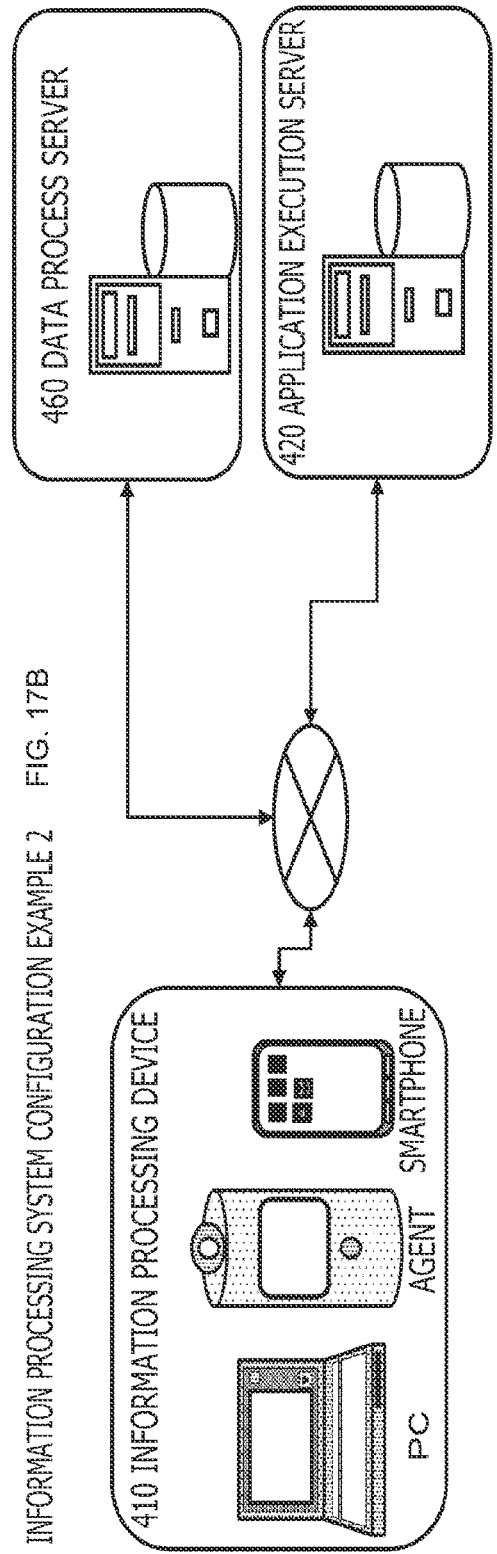
INFORMATION PROCESSING SYSTEM CONFIGURATION EXAMPLE 2    FIG. 17B

INFORMATION PROCESSING DEVICE, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2019/021306 filed on May 29, 2019, which claims priority benefit of Japanese Patent Application No. JP 2018-136672 filed in the Japan Patent Office on Jul. 20, 2018. Each of the above-referenced applications is hereby incorporated herein by reference in its entirety.

TECHNICAL FIELD

The present disclosure relates to an information processing device, an information processing system, an information processing method, and a program. More particularly, the present disclosure relates to an information processing device, an information processing system, an information processing method, and a program that perform a process and a response that are based on the result of speech recognition of a user utterance.

BACKGROUND ART

Nowadays, use of a speech recognition system which performs speech recognitions of user utterances and performs various processes and responses based on the results of the speech recognitions is increasing.

Such a speech recognition system recognizes and understands a user utterance that is input via a microphone, to perform a process according to the user utterance.

For example, in the case where a user makes an utterance "What does the weather look like tomorrow," the system acquires weather information from a weather information providing server to generate a system response based on the acquired information, and outputs the generated response via a speaker. Specifically, for example, such a system response as described below is output.

System utterance="The weather tomorrow is supposed to be fine, but there may be a thunder shower."

A device that performs speech recognition of a user utterance and implements conversation with the user in such a way as described above is called agent equipment, a smart speaker, or the like, and use of such a device is increasing these days.

The function of such agent equipment is also evolving day by day and has become capable of performing various processes. For example, when a user makes an utterance "Send a photograph to Mr. XX at eight o'clock tomorrow," in the way following this utterance, a process of sending an email with the photograph attached to Mr. XX at eight o'clock next day is performed. Further, when a user makes an utterance "take a photograph," such a process is performed that a photograph is taken and the taken photograph is saved into a server coupled to the device.

As a problem of this agent equipment, such false operation occurs that the agent equipment erroneously performs a process according to the utterance that the user has made, not to the equipment, but to his or her family member. As a typical configuration for preventing such false operation, there is a configuration using a startup word. That is, this configuration is implemented such that the startup word is uttered first, and then, only an utterance following the startup word is accepted. However, there are not a few complaints finding it troublesome to utter the setup word each time.

However, when a setting not using the setup word is made, even in the case where, for example, a user has uttered the word "photograph" to his or her family member, a problem likely to lead to privacy leak may be caused by such operation that the equipment takes a photograph without any confirmation and sends the photograph to a server, resulting in the publication of the photograph without the user's knowledge.

Here, as a conventional technology that discloses a configuration for preventing such an external leakage of privacy information, there is PTL 1 (Japanese Patent Laid-open No. 2005-99944). This literature discloses a configuration in which privacy information associated with information regarding a condition for external publication is stored in a storage unit of a mobile terminal and the external publication is made or ceased after the execution of a determination as to whether or not the condition is satisfied.

This method, however, needs a user's sequential setting of a publication condition for each piece of privacy information, and this user's sequential setting of the condition on each piece of information is a heavy burden in a configuration, such as that of the agent equipment, in which pieces of new information are input one after another. Such setting is also unlikely to be used as a realistic solution.

CITATIOIN LIST

Patent Literature

[PTL 1]
Japanese Patent Laid-open No. 2005-99944

SUMMARY

Technical Problems

The present disclosure has been made in view of the above problem and aims to provide an information processing device, an information processing system, an information processing method, and a program that achieve reduction of a possibility of occurrence of a user's privacy information leakage problem or the like.

Further, the present disclosure aims to provide an information processing device, an information processing system, an information processing method, and a program that achieve reduction of a possibility of execution of an erroneous process by changing a processing mode according to the risk of a process to be performed by the agent equipment.

Solution to Problems

A first aspect of the present disclosure is an information processing device including a limited utterance determination unit that determines whether or not a user utterance is a limited utterance among one or more pre-registered limited utterances, a risk determination unit that, in a case where a result of the determination is that the user utterance is not any one of the one or more pre-registered limited utterances, determines a risk of a process corresponding to the user utterance, and a process execution unit that, in a case where the risk of the process corresponding to the user utterance is not a low risk, outputs a guidance that prompts a user to make a limited utterance among the one or more pre-registered limited utterances.

Moreover, a second aspect of the present disclosure is an information processing system including a user terminal and a data process server. The user terminal includes a speech input unit to which a user utterance is input and a speech output unit that outputs a system utterance generated by the data process server. The data process server includes a limited utterance determination unit that determines whether or not the user utterance is a limited utterance among one or more pre-registered limited utterances and a risk determination unit that, in a case where a result of the determination is that the user utterance is not any one of the one or more pre-registered limited utterances, determines a risk of a process corresponding to the user utterance. The data process server outputs, to the user terminal, a guidance that prompts a user to make a limited utterance among the one or more pre-registered limited utterance in a case where the risk of the process corresponding to the user utterance is not a low risk.

Further, a third aspect of the present disclosure is an information processing method performed in an information processing device. The information processing method includes a limited utterance determination step of causing a limited utterance determination unit to determine whether or not a user utterance is a limited utterance among one or more pre-registered limited utterances, a risk determination step of, in a case where a result of the determination is that the user utterance is not any one of the one or more pre-registered limited utterances, causing a risk determination unit to determine a risk of a process corresponding to the user utterance, and a process execution step of, in a case where the risk of the process corresponding to the user utterance is not a low risk, causing a process execution unit to output a guidance that prompts a user to make a limited utterance among the one or more pre-registered limited utterances.

Further, a fourth aspect of the present disclosure is an information processing method performed in an information processing system including a user terminal and a data process server. The information processing method includes causing the user terminal to receive an input of a user utterance through a speech input unit and transmit the user utterance to the data process server, and causing the data process server to perform a limited utterance determination process of determining whether or not the user utterance is a limited utterance among one or more pre-registered limited utterances, a risk determination process of, in a case where a result of the determination is that the user utterance is not any one of the one or more pre-registered limited utterances, determining a risk of a process corresponding to the user utterance, and a process of, in a case where the risk of the process corresponding to the user utterance is not a low risk, outputting a guidance that prompts a user to make a limited utterance among the one or more pre-registered limited utterances.

Furthermore, a fifth aspect of the present disclosure is a program for causing information processing to be performed in an information processing device, and the information processing includes a limited utterance determination step of causing a limited utterance determination unit to determine whether or not a user utterance is a limited utterance among one or more pre-registered limited utterances, a risk determination step of, in a case where a result of the determination is that the user utterance is not any one of the one or more pre-registered limited utterances, causing a risk determination unit to determine a risk of a process corresponding to the user utterance, and a process execution step of, in a case where the risk of the process corresponding to the user utterance is not a low risk, causing a process execution unit to output a guidance that prompts a user to make a limited utterance among the one or more pre-registered limited utterances.

Note that the program of the present disclosure is a program that can be provided, to an information processing device and a computer system that are capable of executing various program codes, by means of a recording medium or a communication medium provided in a computer-readable form. BY providing such a program in a computer-readable form, a process according to the program can be implemented on the information processing device and the computer system.

Further other objectives, features, and advantages of the present disclosure will be clarified by further detailed description based on practice examples described later and accompanying drawings. Note that the system in the description is a plurality of logical set configurations of devices, and the devices of each configuration are not necessarily inside the same housing.

Advantageous Effects of Invention

The configuration of an embodiment of the present disclosure achieves a configuration that reduces false operation by means of the process control that takes into account a risk caused by a process corresponding to a user utterance and the display of an utterance guidance.

Specifically, for example, a limited utterance determination unit that determines whether or not a user utterance is a limited utterance among one or more pre-registered limited utterances, a risk determination unit that, in the case where the result of the determination is that the user utterance is not any one of the one or more pre-registered limited utterances, determines the risk of a process corresponding to the user utterance, and a process execution unit that, in the case where the risk of the process corresponding to the user utterance is not a low risk, outputs a guidance that prompts a user to make a limited utterance included in the one or more pre-registered limited utterances are provided. In the case where the process corresponding to the user utterance is not a low risk, the process execution unit outputs an alert including explanation information regarding the risk. In addition, in the case where the user utterance is any one of the one or more pre-registered limited utterances, the process execution unit does not obtain the meaning analysis result of the user utterance but performs a process corresponding to the user utterance.

This configuration achieves a configuration that reduces false operation by means of the process control that takes into account a risk caused by a process corresponding to a user utterance and the display of an utterance guidance.

Note that effects described in the present description are mere examples and do not limit the effects of the present disclosure. Additional effects may be included therein.

BRIEF DESCRIPTION OF DRAWINGS

FIG. 1 is a diagram that describes a specific example of processing performed by an information processing device that makes a response to a user utterance.

FIG. 5 is a diagram that describes an example of storage data of a limited utterance information database.

FIG. 6 is a diagram that describes an example of storage data of a risk determination information database.

FIG. 16 is a diagram that describes an example of storage data of the limited utterance information database.

FIGS. 17A and 17B depict diagrams that describe configuration examples of an information processing system.

DESCRIPTION OF EMBODIMENT

Figure 2:
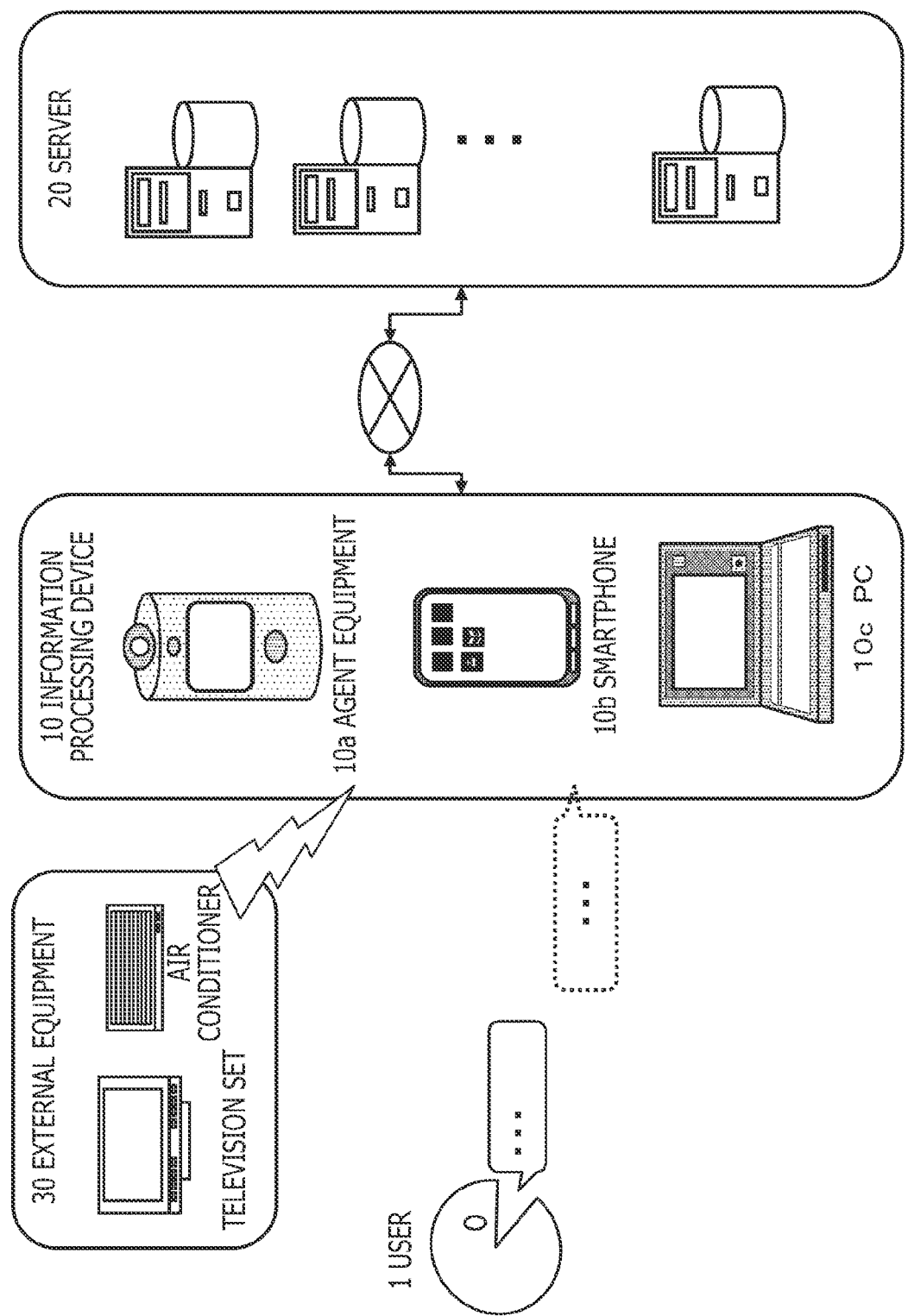
FIG. 2 is a diagram that describes a configuration example and a use example of the information processing device.

Hereinafter, the details of an information processing device, an information processing system, an information processing method, and a program of the present disclosure will be described referring to the drawings. Here, the description will be made following the items below. .
Regarding the overview of processing performed by the information processing device 2. Regarding a problem of a speech recognition device (agent equipment)

3. Regarding a configuration example of the information processing device

4. Regarding a specific example of processing performed by the information processing device 5. Regarding a sequence of processing performed by the information processing device 6. Regarding a learning process performed by a learning process execution unit 7. Regarding other examples of processing and functions performed by the information processing device 8. Regarding configuration examples of the information processing device and the information processing system 9. Regarding a configuration example of hardware of the information processing device 10. Summary of the configuration of the present disclosure

[1. Regarding the Overview of Processing Performed by the Information Processing Device]

First, the overview of processing performed by the information processing device of the present disclosure will be described with reference to FIG. 1 and subsequent drawings.

FIG. 1 is a diagram illustrating an example of processing performed by an information processing device 10 that recognizes a user utterance uttered by a user 1 and makes a response.

The information processing device 10 performs a speech recognition process on, for example, the following user utterance.

User utterance="What does the weather look like in Osaka tomorrow afternoon?"

Moreover, the information processing device 10 performs a process based on the result of the speech recognition of the user utterance.

In an example depicted in FIG. 1, the information processing device 10 acquires data for responding to the user utterance="What does the weather look like in Osaka tomorrow afternoon?" generates a response on the basis of the acquired data, and outputs the generated response via a speaker 14.

In the example depicted in FIG. 1, the information processing device 10 is making the following system response.

System utterance="The weather is supposed to be fine in Osaka tomorrow afternoon, but there may be a shower in the evening."

The information processing device 10 performs a text-to-speech (TTS) process, and generates and outputs the above system response.

The information processing device 10 generates and outputs a response by using knowledge data having been acquired from a storage unit inside the device or knowledge data having been acquired via a network.

The information processing device 10 illustrated in FIG. 1 includes a camera 11, a microphone 12, a display unit 13, and the speaker 14, and thus has a configuration capable of inputting/outputting speeches and inputting/outputting images.

The information processing device 10 illustrated in FIG. 1 is called, for example, a smart speaker or agent equipment.

As illustrated in FIG. 2, the information processing device 10 of the present disclosure can be implemented in one of various forms such as, not only agent equipment 10a, but also a smartphone 10b and a PC 10c.

The information processing device 10 not only recognizes the utterance of the user 1 to make a response based on the user utterance, but also, for example, performs, according to a user utterance, control of external equipment 30 such as a television set and an air conditioner, which are illustrated in FIG. 2.

For example, in the case where the user utterance is a request such as "Change the channel of the television set to 1" or "Set the temperature of the air conditioner to 20 degrees," the information processing device 10 outputs a control signal (Wi-Fi, infrared light, or the like) to the external equipment 30 on the basis of the result of the speech recognition of the above user utterances and performs control according to the user utterances.

Note that the information processing device 10 is coupled to a server 20 via a network and is capable of acquiring, from the server 20, information needed to generate a response to the user utterance. Further, the information processing device 10 may be configured to allow the server to perform the speech recognition process and a meaning analysis process.

[2. Regarding a Problem of a Speech Recognition Device (Agent Equipment)]

Next, a problem that the information processing device 10 of the present disclosure attempts to solve, that is, a problem of a conventional speech recognition device (agent equipment), will be described.

As the problem of the agent equipment, for example, there is a false operation problem in that the agent equipment erroneously performs processing in response to an utterance that a user has made, not to the equipment, but to his or her family member. A specific example will be described with reference to FIG. 3.

Figure 3:
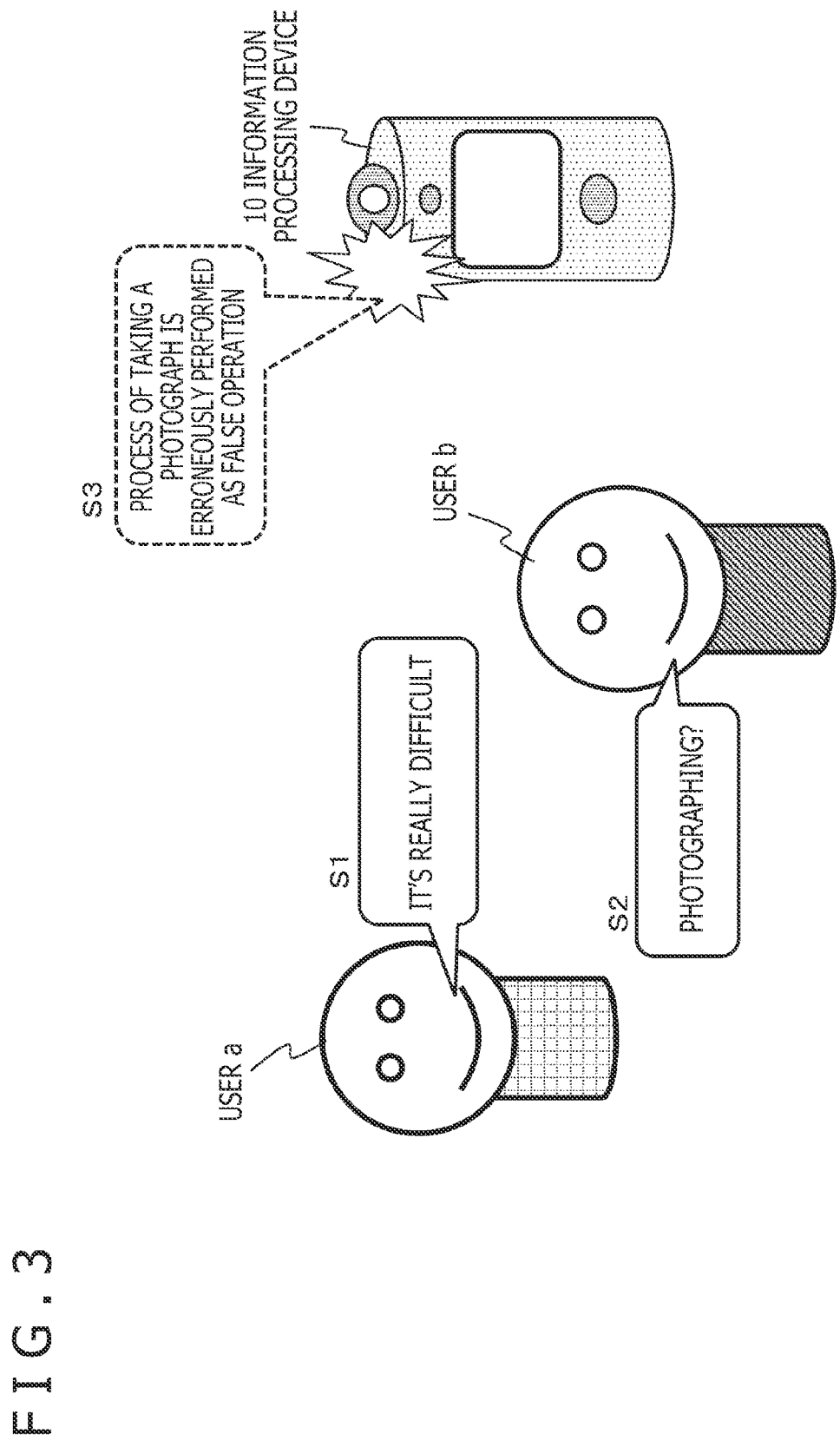
FIG. 3 is a diagram that describes a problem of agent equipment.

FIG. 3 illustrates the information processing device 10 and users a and b who are making a conversation in front thereof.

The users a and b are not making utterances to the information processing device 10 but are making a conversation therebetween.

In steps S1 and S2, the users a and b make the following conversation.

Utterance of the user a="It's really difficult."
Utterance of the user b="Photographing?"

This conversation between the users is such that, in response to the word "difficult" having been mentioned by the user a, in order to confirm what is difficult, the user b has made the utterance "Photographing?" that actually means "Is photographing difficult?"

Upon input of this utterance made by the user b into the information processing device 10, the information processing device 10 performs the speech recognition and the utterance meaning analysis of the input utterance, and determines that the user b is requesting photographing, as the result of the analysis.

As a result of this determination, in step S3, the information processing device 10 erroneously performs photographing.

For example, a situation may occur in which the taken photograph is automatically uploaded to a server coupled to the information processing device 10 and is made public.

The information processing device of the present disclosure is configured to be capable of preventing or reducing, for example, the occurrence of such a problem.

[3. Regarding a Configuration Example of the Information Processing Device]

Next, a specific configuration example of the information processing device will be described with reference to FIG. 4.

Figure 4:
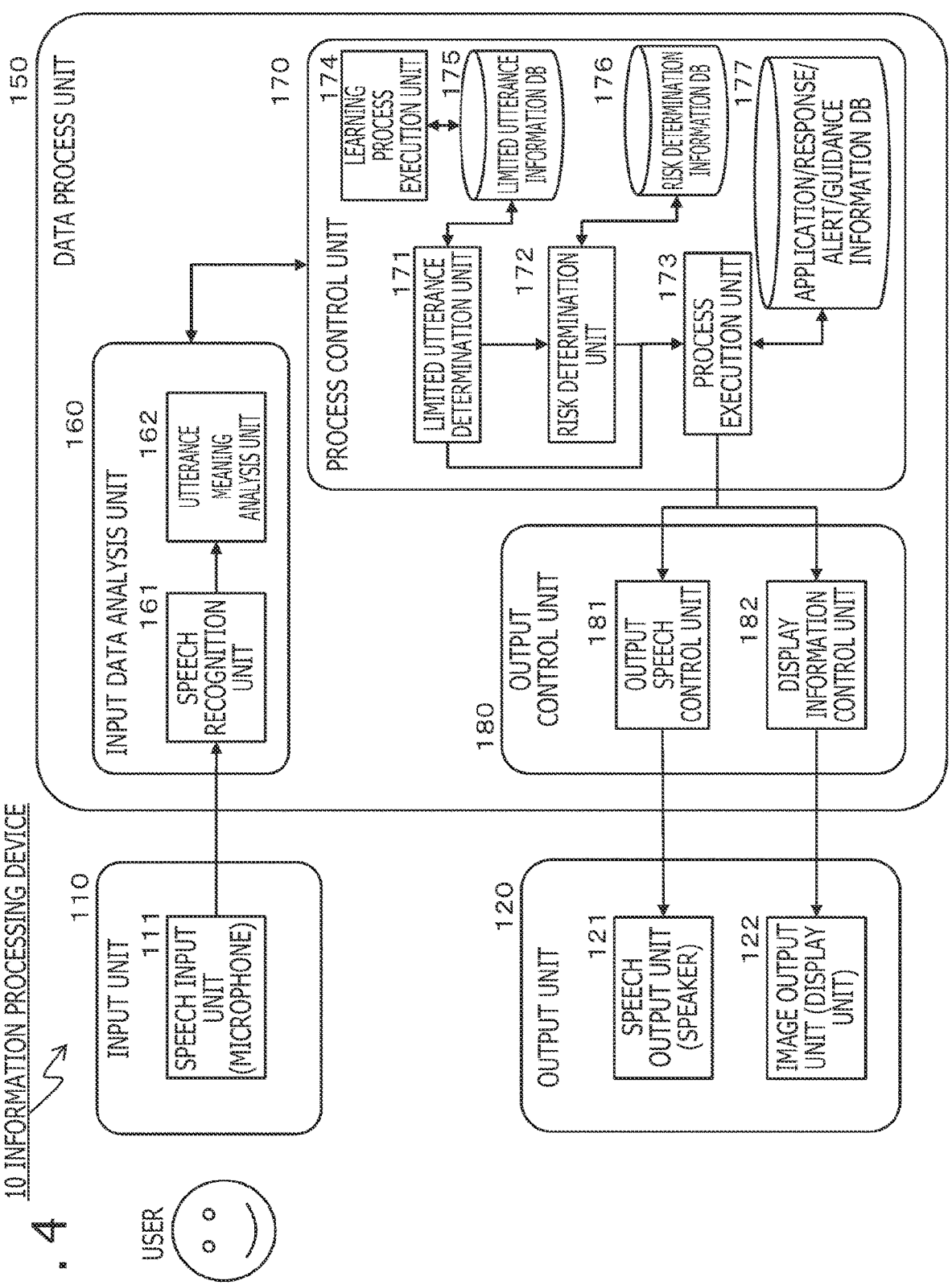
FIG. 4 is a diagram that describes a configuration example of the information processing device.

FIG. 4 is a diagram illustrating a configuration example of the information processing device 10 that recognizes a user utterance and makes a response.

As illustrated in FIG. 4, the information processing device 10 includes an input unit 110, an output unit 120, and a data process unit 150.

Here, the data process unit 150 can be configured inside the information processing device 10, but instead, the data process unit 150 may not be configured inside the information processing device 10 and a data process unit of an external server may be used. In the case of the configuration using the server, the information processing device 10 transmits input data having been input from the input unit 110 to the server via a network, receives the result of processing by the data process unit 150 of the server, and outputs the processing result via the output unit 120.

Next, constituent units of the information processing device 10 illustrated in FIG. 4 will be described.

The input unit 110 includes a speech input unit (microphone) 111.

The output unit 120 includes a speech output unit (speaker) 121 and an image output unit (display unit) 122.

The information processing device 10 includes these constituent units at minimum.

The speech input unit (microphone) 111 corresponds to the microphone 12 of the information processing device 10 illustrated in FIG. 1. Note that the input unit 110 may be configured to further include an image input unit corresponding to the camera 11 of the information processing device 10 illustrated in FIG. 1. The image input unit is not an essential constituent unit in the processing of the present disclosure and is thus omitted in FIG. 4.

The speech output unit (speaker) 121 corresponds to the speaker 14 of the information processing device 10 illustrated in FIG. 1.

The image output unit (display unit) 122 corresponds to the display unit 13 of the information processing device 10 illustrated in FIG. 1.

In addition, the image output unit (display unit) 122 can be configured by, for example, a projector or a display of a liquid crystal display unit or the like, and can also be configured using a display unit of the television set as the external equipment.

As described above, the data process unit 150 is configured in either the information processing device 10 or the server capable of communicating with the information processing device 10.

The data process unit 150 includes an input data analysis unit 160, a process control unit 170, and an output control unit 180.

The input data analysis unit 160 includes a speech recognition unit 161 and an utterance meaning analysis unit 162.

A speech of a user utterance is input to the speech input unit 111.

The speech input unit (microphone) 111 inputs the input speech of the user utterance into the speech recognition unit 161.

The speech recognition unit 161 has, for example, an ASR (Automatic Speech Recognition) function, and converts speech data into text data composed of a plurality of words.

The text data having been generated in the speech recognition unit 161 is input to the utterance meaning analysis unit 162.

The utterance meaning analysis unit 162 selects and outputs a candidate of a user's intention included in the text.

The utterance meaning analysis unit 162 has a natural language understanding function such as an NLU (Natural Language Understanding) and presumes the intention (Intent) of the user utterance and entity information (Entity) that is a meaningful factor (significant factor) included in the utterance, for example.

The information processing device 10 can perform accurate processing on the user utterance, provided that the intention (Entity) and the entity information (Entity) can be presumed and acquired accurately from the user utterance.

The text data which has been generated in the speech recognition unit 161 and the intention (Intent) and the entity information (Entity) which have been analyzed in the utterance meaning analysis unit 162 are input to the process control unit 170.

The process control unit 170 includes a limited utterance determination unit 171, a risk determination unit 172, a process execution unit 173, a learning process execution unit 174, a limited utterance information DB 175, a risk determination information DB 176, and an application/response/alert/guidance information DB 177.

Upon input of the text data having been generated in the speech recognition unit 161, the limited utterance determination unit 171 determines whether or not the user utterance is a limited utterance among one or more pre-registered limited utterances. Specifically, the limited utterance determination unit 171 determines whether or not the user utterance is an utterance registered in the limited utterance information DB 175.

An example of the registered data of the limited utterance information DB 175 is illustrated in FIG. 5.

A plurality of limited utterances is registered in advance in the limited utterance information DB 175. As illustrated in FIG. 5, pieces of text data corresponding to the user utterances and tags (Limited) each indicating that a corresponding user utterance is a limited utterance are registered so as to be associated with each other.

As illustrated in FIG. 5, pieces of data such as those described below are registered in the limited utterance information DB 175.

(1) TAKE A PHOTOGRAPH=Limited (=limited utterance)
(2) SEND AN EMAIL=Limited (=limited utterance)
(3) SHOW ME THE SCHEDULE=Limited (=limited utterance)
(4) TELL ME THE WEATHER FORECAST=Limited (=limited utterance)
(5) TURN ON THE LIGHT=Limited (=limited utterance)

For example, such pieces of data described above are registered as limited utterance information.

The limited utterance determination unit 171 determines whether or not the text data which has been generated in the speech recognition unit 161 matches with a piece of text data among the pieces of text data registered in the limited utterance information DB 175. In the case where the text data matches with the piece of text data, it is determined that the user utterance is a limited utterance, and a process corresponding to the user utterance is performed in the process execution unit 173 on the basis of the determination.

In this case, the utterance meaning analysis process in the utterance meaning analysis unit 162 of the input data analysis unit 160 is omitted.

In the case where the user utterance is a limited utterance registered in the limited utterance information DB 175, a to-be-executed process (an application or the like) corresponding to the user utterance is associated with the user utterance in advance. The application/response/alert/guidance information DB 177, which, for example, is referred to and used by the process execution unit 173 in its process execution, stores therein pieces of data regarding correspondences between limited utterances and pieces of to-be-executed processes (pieces of application specification information or the like).

In the case where the limited utterance determination unit 171 determines that the user utterance is a limited utterance, a piece of information regarding the limited utterance is input to the process execution unit 173. The process execution unit 173 acquires a process associated with the input limited utterance by making a search on the pieces of registered data of the application/response/alert/guidance information DB 177, and performs the acquired process.

Specifically, in the case where the user utterance is, for example, "TAKE A PHOTOGRAPH" corresponding to an entry (1) and being a piece of registered data of the limited utterance information DB 175 illustrated in FIG. 5, the process execution unit 173 starts up an application for photographing and performs photographing.

In this way, in the case where the user utterance is a limited utterance registered in the limited utterance information DB 175, the utterance meaning analysis of the user utterance is not performed, and a process corresponding to the user utterance is instantly performed using only the result of the speech recognition. Thus, a period of time until the start of the process is largely shortened, enabling execution of processing with excellent responsiveness.

On the contrary, in the case where the limited utterance determination unit 171 determines that the text data input from the speech recognition unit 161 does not match with any one of the pieces of text data registered in the limited utterance information DB 175, the limited utterance determination unit 171 determines that the user utterance is an unlimited utterance. This determination information is input to the risk determination unit 172, and a risk determination process by the risk determination unit 172 is started.

Upon receipt of the determination result input from the limited utterance determination unit 171 and indicating that the user utterance is an unlimited utterance, the risk determination unit 172 receives an input of the result of the meaning analysis of the user utterance from the utterance meaning analysis unit 162 of the input data analysis unit 160.

The risk determination unit 172 confirms the intention of the user utterance, on the basis of the input result of the meaning analysis of the user utterance, and determines the degree of the risk of a process according to the intention of the user utterance. This risk determination uses information stored in the risk determination information DB 175.

FIG. 6 illustrates an example of pieces of data stored in the risk determination information DB 175. In the risk determination information DB 175, risk levels of various processes performed in the information processing device 10 are registered. The risk levels are, for example, three stages, and any one of a low risk, a medium risk, or a high risk is registered so as to be associated with each of the processes.

Note that the risk levels are not limited to the three stages, and various settings such as a setting of level values 0 to 100 can be made, for example.

As illustrated in FIG. 6, in the risk determination information DB 175, for example, the following processes and risk levels thereof are registered.

(11) TAKING PHOTOGRAPH=HIGH RISK
(12) SENDING PHOTOGRAPH TO OUTSIDE (SERVER, etc.)=HIGH RISK
(13) SENDING CONVERSATION AS MESSAGE=HIGH RISK
(14) PLAYING MUSIC AT LOUD VOLUME=HIGH RISK
(21) INPUTTING SCHEDULE=MEDIUM RISK
(22) PLAYING MUSIC=MEDIUM RISK
(31) OUTPUTTING WEATHER INFORMATION=LOW RISK
(32) OUTPUTTING PHOTO SLIDE SHOW=LOW RISK In the risk determination information DB 175, for example, the risk levels of various processes performed in the information processing device 10 are registered in such a way as described above.

Upon input of the result of the meaning analysis of the user utterance from the utterance meaning analysis unit 162, the risk determination unit 172 determines a risk level of the process according to the intention of the user utterance, on the basis of a piece of registered data of the risk determination information DB 175.

In the case where the risk level of the process according to the intention of the user utterance is a low level (low risk), the process execution unit 173 is caused to perform the process according to the intention of the user utterance.

On the contrary, in the case where the risk level of the process according to the intention of the user utterance is a medium level (medium risk) or a high level (high risk), the process execution unit 173 is caused not to perform the process according to the intention of the user utterance, but to perform, for example, a process of outputting an alert; a display of guidance information that prompts a user to make a re-utterance that matches with a limited utterance; a preliminary low-risk level process associated with a process corresponding to the user utterance; or the like. Specific examples of these processes will be described later.

The process execution unit 173 performs the process according to the user utterance and the above-described processes of outputting an alert, outputting guidance information, and the like.

Further, as described above, in the case where the user utterance is a limited utterance, the process execution unit 173 dose not acquire the result of the meaning analysis of the utterance, but performs a process associated with a text acquired as the result of the speech recognition.

On the contrary, in the case where the user utterance is an unlimited utterance, the process execution unit 173 acquires the result of the meaning analysis of the utterance and further performs, according to the risk level of the process corresponding to the user utterance, the following processes.

(a) In the case where the process corresponding to the user utterance is a low-risk process, the process is performed.

(b) In the case where the process corresponding to the user utterance is a medium-risk process or a high-risk process, the process of outputting an alert; the display of guidance information that prompts a user to make a re-utterance that matches with a limited utterance; the preliminary low-risk level process associated with a process corresponding to the user utterance; or the like is performed.

The learning process execution unit 174 updates the registered data of the limited utterance information DB 175 by means of its learning process. That is, the learning process execution unit 174 performs, for example, a process of registering a piece of new limited utterance information, and the like. The details of this learning process will be described later.

The result of the process execution in the process execution unit 173 is output via the output control unit 180.

The output control unit 180 includes an output speech control unit 181 and a display information control unit 182. The output speech control unit 181 generates a system utterance to the user on the basis of a process having been determined by the process execution unit. Response speech information having been generated by the output speech control unit 181 is output via the speech output unit 121, which is a speaker or the like.

The display information control unit 182 performs processing for generation, updating, and the like of display information for the image output unit (display unit) 122, on the basis of the result of execution of the process by the process execution unit 173.

[4. Regarding a Specific Example of Processing Performed by the Information Processing Device]

Next, a specific example of processing performed by the information processing device 10 of the present disclosure will be described with reference to FIG. 7 and subsequent drawings.

Figure 7:
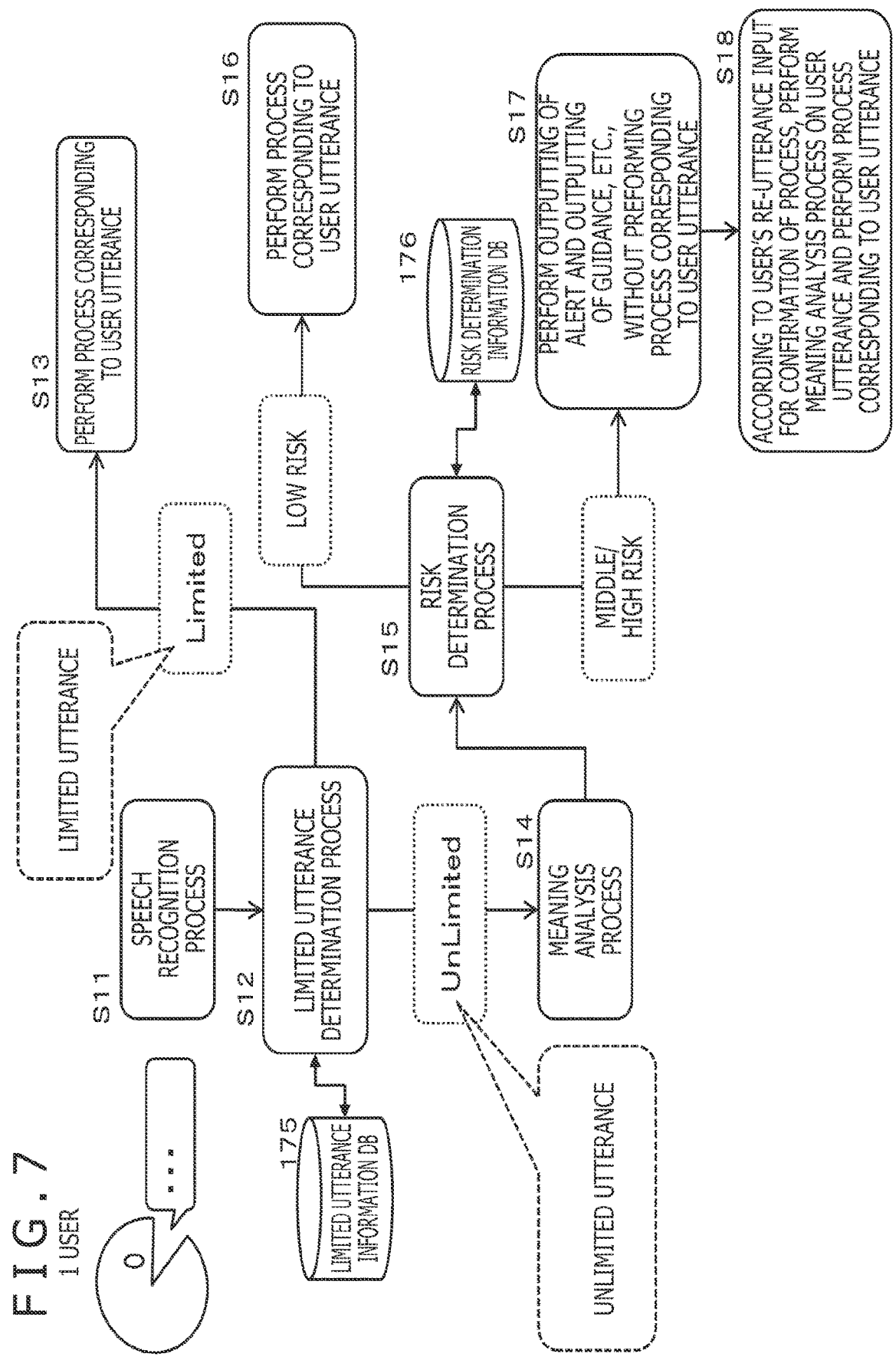
FIG. 7 is a diagram that describes a specific example of a process performed by the information processing device of the present disclosure.

FIG. 7 is a diagram that describes processing performed by the information processing device 10 of the present disclosure. A user 1 illustrated in FIG. 7 makes a user utterance. The information processing device 10 performs, according to the user utterance, processes in step S11 and subsequent steps illustrated in FIG. 7.

Here, the processes illustrated in FIG. 7 can be performed according to a program stored in the storage unit of the information processing device 10, and can be performed under the control of, for example, a control unit (data process unit) including a processor, such as a CPU, having a program execution function.

In the following, processes of individual steps illustrated in FIG. 7 will be described.

(Step S11)

First, in step S11, the speech recognition unit 161 performs a speech recognition process on the user utterance.

The speech recognition unit 161 has, for example, the ASR (Automatic Speech Recognition) function and converts speech data into text data composed of a plurality of words.

The result of the speech recognition process by the speech recognition unit 161 is input to the utterance meaning analysis unit 162 and is simultaneously input to the limited utterance determination unit 171 of the process control unit 170.

(Step S12)

The process in step S12 is a process performed by the limited utterance determination unit 171 of the process control unit 170.

Upon input of text data having been generated in the speech recognition unit 161, the limited utterance determination unit 171 determines whether or not the user utterance is a limited utterance among one or more pre-registered limited utterances. Specifically, the limited utterance determination unit 171 determines whether or not the user utterance is an utterance registered in the limited utterance information DB 175.

In the case where it is determined that the user utterance is a limited utterance registered in the limited utterance information DB 175, the flow proceeds to step S13.

In contrast, in the case where it is determined that the user utterance is an unlimited utterance that is not registered in the limited utterance information DB 175, the flow proceeds to step S14.

(Step S13)

The process in step S13 is performed in the case where it has been determined in step S12 that the user utterance is a limited utterance registered in the limited utterance information DB 175.

In this case, in step S13, the process execution unit 173 performs a process corresponding to the user utterance. In this case, the utterance meaning analysis of the user utterance is not performed, and the process corresponding to the user utterance is instantly performed using only the result of the speech recognition. Thus, a period of time until the start of the process is largely shortened, enabling execution of processing with excellent responsiveness.

Figure 8:
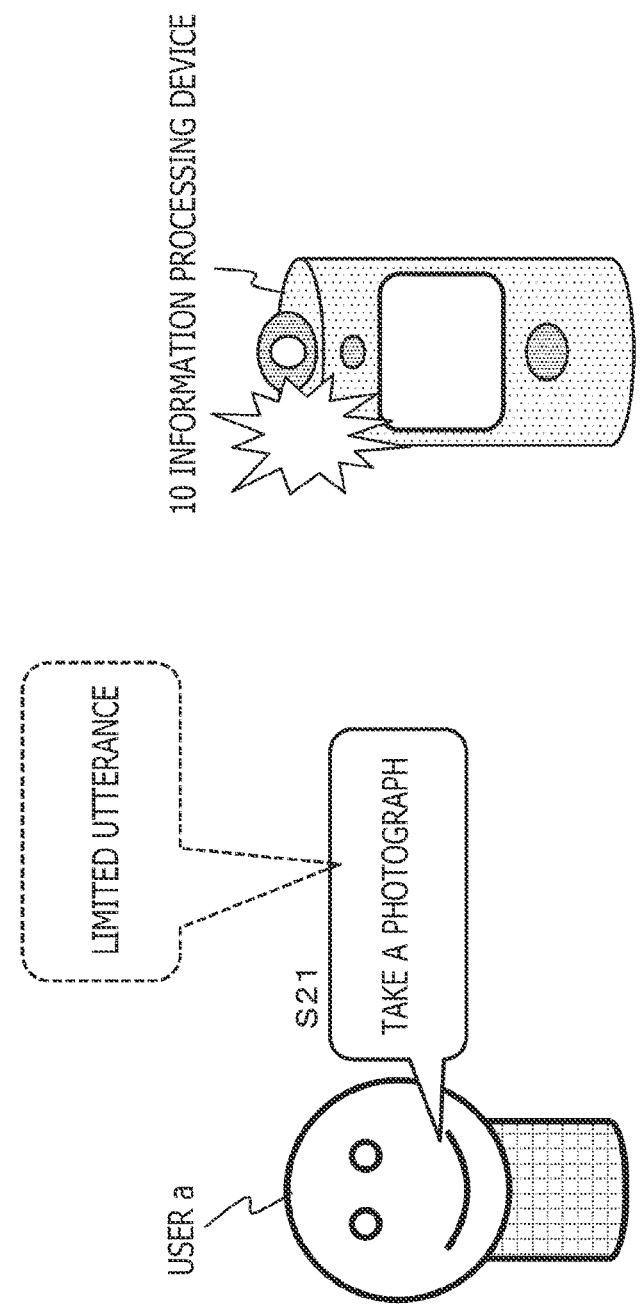
FIG. 8 is a diagram that describes a specific example of a process performed by the information processing device of the present disclosure.

FIG. 8 illustrates an example of processing in the case where the user utterance is a limited utterance registered in the limited utterance information DB 175.

A user a illustrated in FIG. 8 makes the following user utterance in step S21.

User utterance=Take a photograph.

This user utterance is a limited utterance registered in the limited utterance information DB 175, which has been described above with reference to FIG. 5. In this case, the limited utterance determination unit 171 of the process control unit 170 determines that the user utterance is a limited utterance, and the process execution unit 173 performs, on the basis of the result of the determination, a process corresponding to the user utterance, i.e., a process of taking a photograph.

(Step S14)

On the contrary, in the case where it has been determined in step S12 that the user utterance is not any one of the limited utterances registered in the limited utterance information DB 175, a process in step S14 is performed.

Step S14 is a meaning analysis process targeted for the user utterance and performed by the utterance meaning analysis unit 162 of the input data analysis unit 160. For example, the intention (Intent) of the user utterance and entity information (Entity) that is a meaningful factor (significant factor) included in the user utterance are presumed.

The information processing device 10 can perform accurate processing on the user utterance, provided that the intention (Entity) and the entity information (Entity) can be presumed and acquired accurately from the user utterance.

The meaning analysis result corresponding to the user utterance and having been generated by the utterance meaning analysis unit 162 is input to the risk determination unit 172 of the process control unit 170.

(Step S15)

The process in step S15 is the risk determination process performed by the risk determination unit 172.

The risk determination unit 172 confirms the intention of the user utterance on the basis of the result of the meaning analysis of the user utterance and determines the degree of the risk of a process according to the intention of the user utterance. In this risk determination, information stored in the risk determination information DB 175, that is, the information stored in the risk determination information DB 175 and having been described above with reference to FIG. 6, is used.

In the case where it is determined that the risk of the process according to the intention of the user utterance is a low risk, the process in step S16 is performed.

On the contrary, in the case where the risk of the process according to the intention of the user utterance is a medium risk or a high risk, the process in step S17 is performed.

(Step S16)

The process in step S16 is performed in the case where it has been determined in step S15 that the risk of the process according to the intention of the user utterance is the low risk.

In step S16, the process according to the intention of the user utterance and having been determined to have the low risk is performed. This process is performed in the process execution unit 173.

(Step S17)

The process in step S17 is performed in the case where it has been determined in step S15 that the risk of the process according to the intention of the user utterance is the medium risk or the high risk.

In step S17, the process according to the intention of the user utterance and having been determined to have the medium risk or the high risk is not performed, and, for example, the process of outputting an alert; the display of guidance information that prompts a user to make a re-utterance that matches with a limited utterance; the preliminary low-risk level process associated with a process corresponding to the user utterance, or the like is performed.

Figure 9:
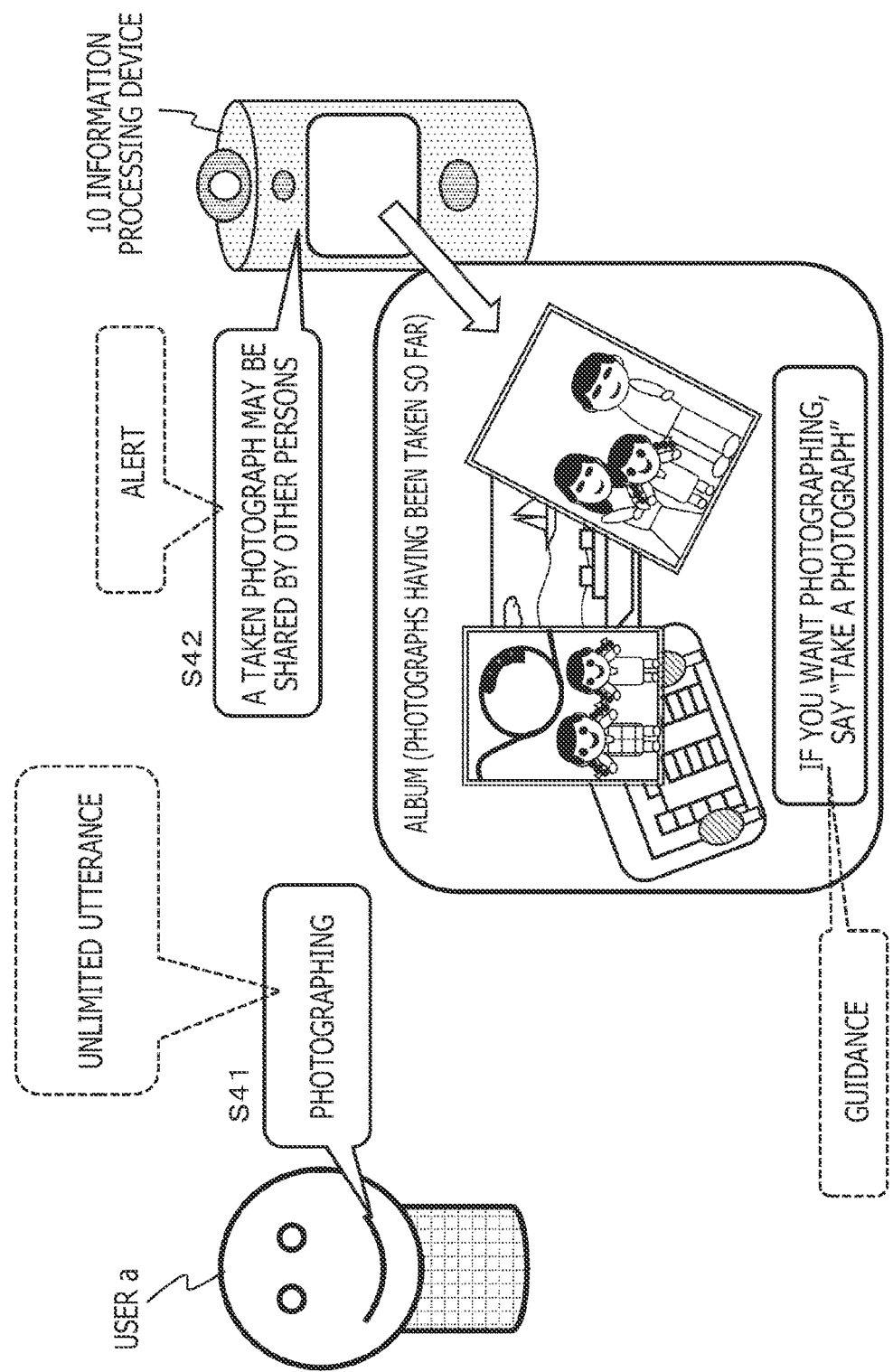
FIG. 9 is a diagram that describes a specific example of a process performed by the information processing device of the present disclosure.

FIG. 9 illustrates a specific example of the process in step S17.

The user a illustrated in FIG. 9 is making the following utterance in step S41.

User Utterance=Photographing.

This user utterance is not any one of the limited utterances registered in the limited utterance information DB 175 and having been described above with reference to FIG. 5. In this case, the limited utterance determination unit 171 of the process control unit 170 determines that the user utterance is not a limited utterance.

Moreover, upon input of the result of the meaning analysis of the user utterance from the utterance meaning analysis unit 162, the risk determination unit 172 determines the risk level of the process according to the intention of the user utterance on the basis of a piece of registered data of the risk determination information DB 175.

The result indicating that the intention of the user is "to take a photograph" is input from the utterance meaning analysis unit 162.

The risk determination unit 172 determines the risk level of the process (taking a photograph) according to the intention of the user utterance on the basis of a piece of registered data of the risk determination information DB 175.

As depicted in the data example illustrated in FIG. 6, taking a photograph is registered as having the high risk.

As a result, the process according to the intention of the user utterance and having been determined to have the high risk in step S17 is not performed, and, for example, the process of outputting an alert; the display of guidance information that prompts a user to make a re-utterance that matches with a limited utterance; the preliminary low-risk process associated with a process corresponding to the user utterance; or the like is performed.

The following system utterance that is made by the information processing device 10 in step S42 illustrated in FIG. 9 corresponds to the alert.

System utterance=A taken photograph may be shared by other persons.

Further, photograph data having been taken in the past is displayed on the display unit of the information processing device. This photograph display process is a process corresponding to the preliminary low-risk level process associated with a process corresponding to the user utterance.

Moreover, the display of the following guidance information on the display unit is performed.

Guidance=If you want photographing, say "take a photograph."

This guidance display is a guidance display that prompts a user who actually wants to request photographing to make the following pre-registered limited utterance.

Limited utterance="Take a photograph."

In this way, in the case where the process according to the intention of the user utterance is determined to have the high risk or the medium risk, the process according to the intention of the user utterance is not performed, and at least any one of the following processes is performed.

(a) The process of outputting an alert (b) The display of guidance information that prompts a user to make a re-utterance that matches with a limited utterance (c) The preliminary low-risk level process associated with a process corresponding to the user utterance (Step S18)

Furthermore, in step S18, in the case where a user's re-utterance following the guidance having been displayed in step S17, that is, an utterance that matches with a registered limited utterance, is input, a process corresponding to the limited utterance is performed.

In the example depicted in FIG. 9, the following information is displayed as the guidance information.

Guidance=If you want photographing, say "take a photograph."

The user follows this guidance information and makes the following user utterance.

User utterance=Take a photograph.

Figure 10:
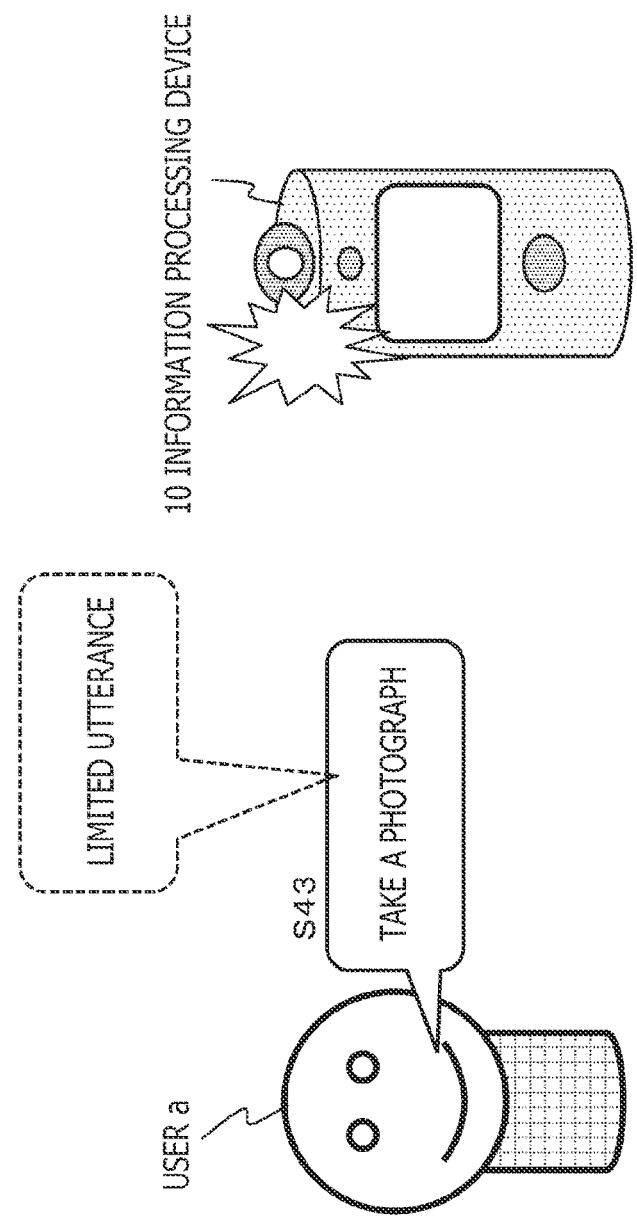
FIG. 10 is a diagram that describes a specific example of a process performed by the information processing device of the present disclosure.

This state is illustrated in FIG. 10.

As illustrated in FIG. 10, the user a is making the following user utterance in step S43.

User utterance=Take a photograph.

This user utterance is a limited utterance registered in the limited utterance information DB 175 and having been described above with reference to FIG. 5. In this case, the limited utterance determination unit 171 of the process control unit 170 determines that the user utterance is a limited utterance, and the process execution unit 173 performs a process corresponding to the user utterance, that is, a process of taking a photograph, on the basis of the result of determination.

In this way, in the case where the risk of a process based on the user utterance is the medium risk or the high risk, the information processing device 10 of the present disclosure does not perform the process based on the result of the meaning analysis of the user utterance and according to the intention of the user, and performs the process of outputting an alert and/or the process of outputting guidance information that prompts a limited utterance.

These processes achieve secure processing that does not cause any problem unintended by a user, such as a privacy leak, for example.

[5. Regarding a Sequence of Processing Performed by the Information Processing Device]

Next, a sequence of processing performed by the information processing device 10 of the present disclosure will be described with reference to a flowchart illustrated in FIG. 11 and subsequent drawings.

Figure 11:
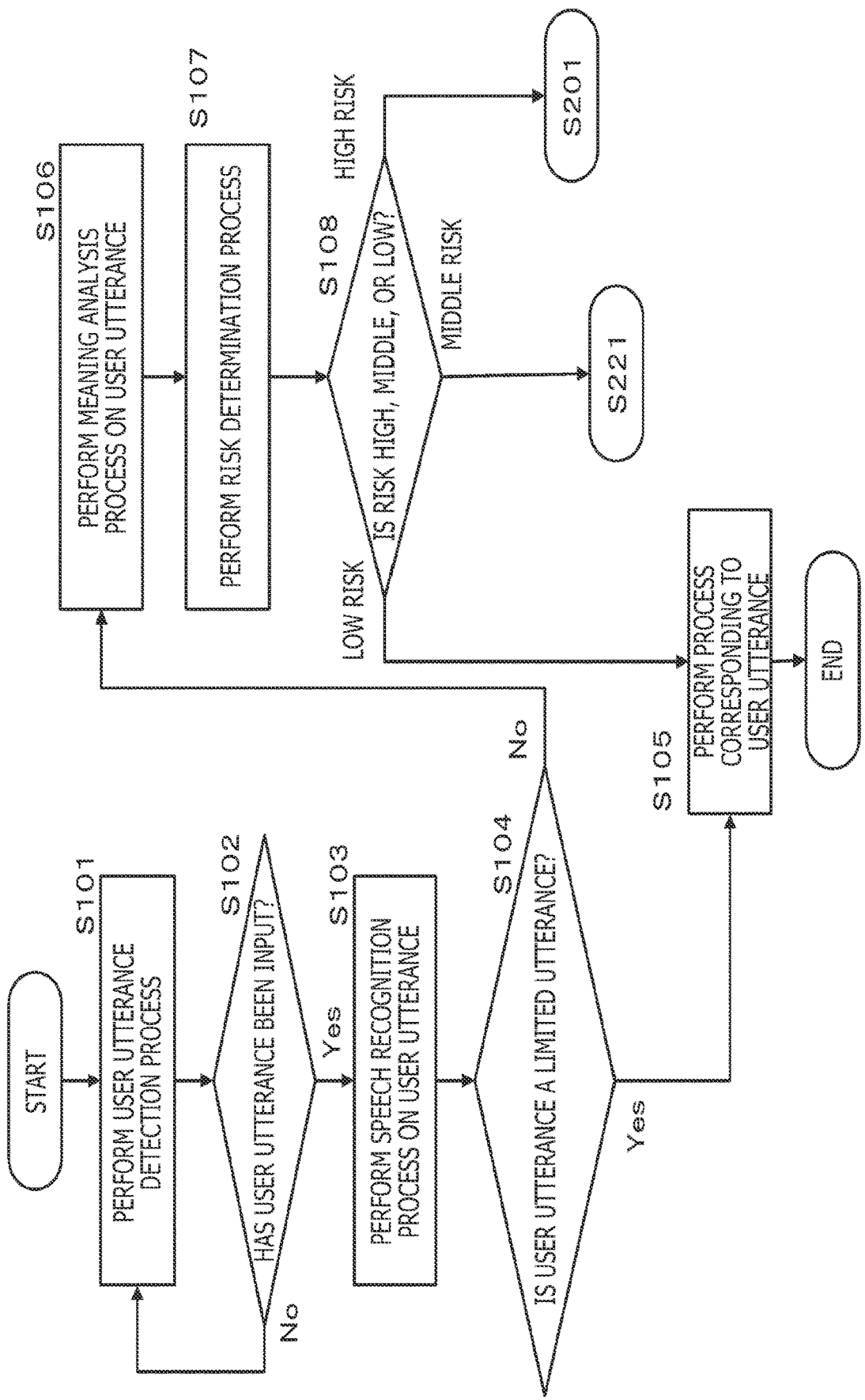
FIG. 11 is a diagram illustrating a flowchart that describes a sequence of processes performed by the information processing device of the present disclosure.

Note that the processing according to the flowchart illustrated in FIG. 11 can be performed according to a program stored in the storage unit of the information processing device 10, and can be performed under the control of, for example, a control unit (data process unit) including a processor, such as a CPU, having a program execution function.

In the following, processes in individual steps of the flow illustrated in FIG. 11 will be described.

(Step S101)

First, in step S101, the information processing device 10 performs a user utterance detection process.

This process is performed by the speech recognition unit 161 of the input data analysis unit 160 depicted in FIG. 4.

(Step S102)

Next, in step S102, the speech recognition unit 161 determines the presence/absence of the detection of a user utterance, and the flow proceeds to step S103 in the case where a user utterance is detected. In the case where no user utterance is detected, the flow returns to step S101, and the user utterance detection process is continued.

(Step S103)

In the case where a user utterance has been detected in step S102, the flow proceeds to step S103. In step S103, the speech recognition process on the user utterance is performed.

This process is performed in the speech recognition unit 161 of the input data analysis unit 160 illustrated in FIG. 4.

The result of the speech recognition of the user utterance which has been performed in the speech recognition unit 161 is input to the limited utterance determination unit 171 of the process control unit 170.

(Step S104)

The process in step S104 is a process performed by the limited utterance determination unit 171 of the process control unit 170.

Upon input of a piece of text data having been generated in the speech recognition unit 161, the limited utterance determination unit 171 determines whether or not the user utterance is a limited utterance among one or more pre-registered limited utterances. Specifically, the limited utterance determination unit 171 determines whether or not the user utterance is an utterance registered in the limited utterance information DB 175.

In the case where it has been determined that the user utterance is a limited utterance registered in the limited utterance information DB 175, the flow proceeds to step S105.

In contrast, in the case where it has been determined that the user utterance is an unlimited utterance that is not registered in the limited utterance information DB 175, the flow proceeds to step S106.

(Step S105)

In the case where it has been determined in step S104 that the user utterance is a limited utterance registered in the limited utterance information DB 175, a process corresponding to the user utterance is performed in step S105.

The process execution unit 173 performs a process associated with a user utterance text that is the result of the speech recognition. Note that processes that are to be performed with respect to texts that match with limited utterances are stored in the application/response/alert/guidance information DB 177.

(Step S106)

In contrast, in the case where it has been determined in step S104 that the user utterance is not any one of the limited utterances registered in the limited utterance information DB 175, the meaning analysis process on the user utterance is performed in step S106.

This process is performed in the utterance meaning analysis unit 162 of the input data analysis unit 160 illustrated in FIG. 4. The utterance meaning analysis unit 162 presumes, for example, the intention (Intent) of the user utterance and the entity information (Entity) which is a meaningful factor (significant factor) included in the utterance.

The meaning analysis result corresponding to the user utterance and having been generated by the utterance meaning analysis unit 162 is input to the risk determination unit 172 of the process control unit 170.

(Step S107)

Next, the risk determination process is performed in step S107.

This process is performed by the risk determination unit 172 of the process control unit 170. The risk determination unit 172 confirms the intention of the user utterance and determines the degree of the risk of a process according to the intention of the user utterance on the basis of the result of the meaning analysis of the user utterance. This risk determination uses information stored in the risk determination information DB 175, that is, the information stored in the risk determination information DB 175 and having been described above with reference to FIG. 6.

(Step S108)

The process in step S108 is a branching process based on the result of the risk determination in step S107.

In the case where it is determined that, as the result of the risk determination in step S107 with respect to the process corresponding to the intention of the user utterance, the process is a low-risk process, the flow proceeds to step S105, and the process having been determined to be the low-risk process is performed.

In contrast, in the case where it is determined that, as the result of the risk determination in step S107 with respect to the process corresponding to the intention of the user utterance, the process is a high-risk process, the flow proceeds to step S201.

Further, in the case where it is determined that, as the result of the risk determination in step S107 with respect to the process corresponding to the intention of the user utterance, the process is a medium-risk process, the flow proceeds to step S221.

Figure 12:
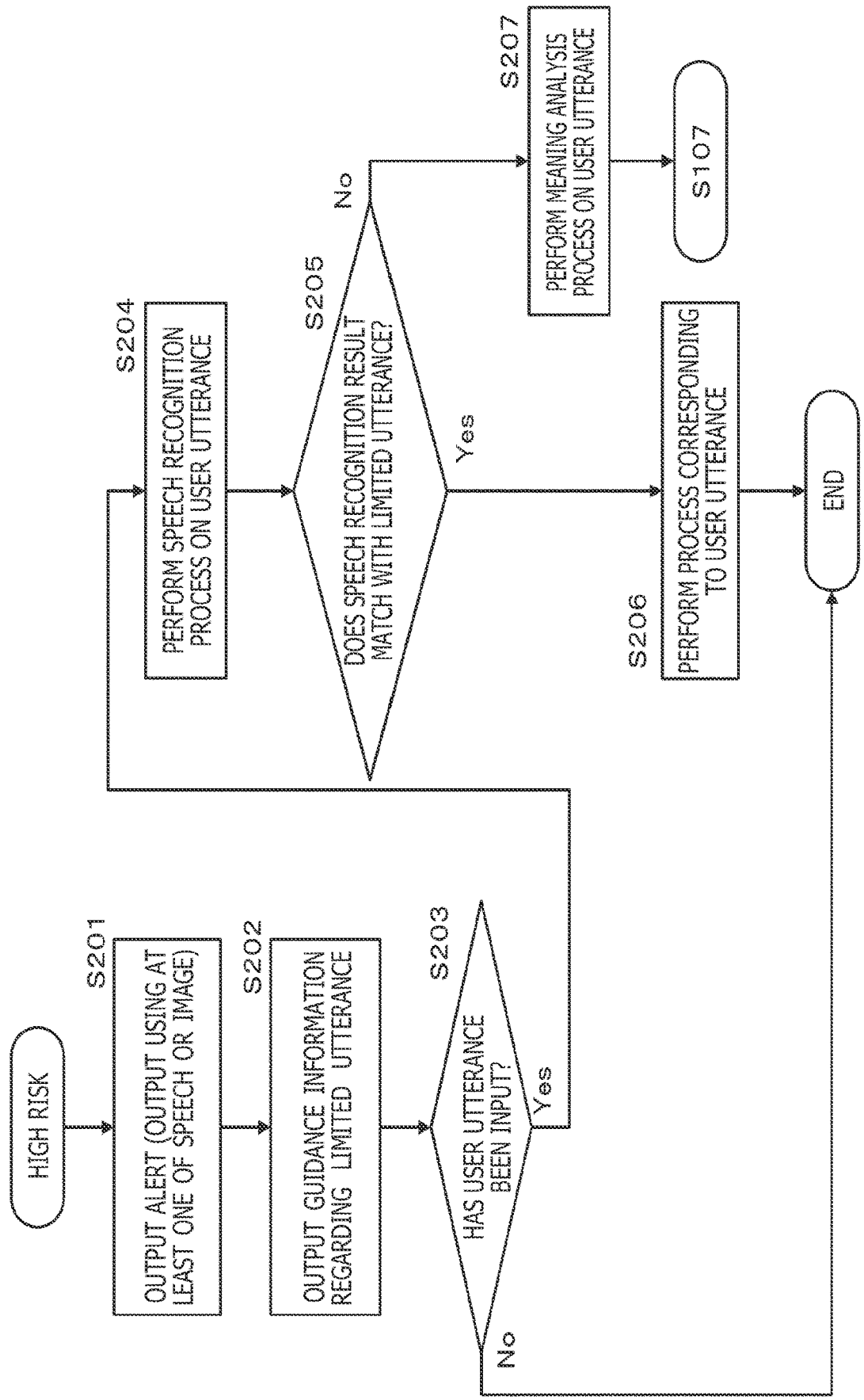
FIG. 12 is a diagram illustrating a flowchart that describes a sequence of processes performed by the information processing device of the present disclosure.

Next, processing in the case where it has been determined in step S108 that the process corresponding to the intention of the user utterance is the high-risk process will be described with reference to a flowchart illustrated in FIG. 12.

(Step S201)

In the case where the risk determination unit 172 has determined that the process corresponding to the intention of the user utterance is the high-risk process, first, in step S201, the process execution unit 173 performs a process of outputting an alert.

This is a process performed for informing a user of an alert and an explanation regarding the risk entailed in the case of the execution of the process based on the user utterance.

The output of the alert is made by outputting a speech or an image.

(Step S202)

Next, in step S202, the process execution unit 173 outputs guidance information regarding a limited utterance.

This is a process corresponding to the process of displaying guidance information, which is described below, in the example having been described above with reference to FIG. 9.

Guidance=If you want photographing, say "take a photograph."

This guidance display is a guidance display that prompts a user who actually wants to request photographing to make a pre-registered limited utterance, that is, Limited utterance="take a photograph."

In this way, in step S202, in order to reconfirm the intention of the user, guidance information is provided for causing the user to make a decision as to whether or not to make a re-utterance of the limited utterance.

(Step S203)

In step S203, it is determined whether or not a new user utterance has been input according to the guidance output having been made in step S202.

In the case where no new user utterance has been input, the processing is terminated.

In contrast, in the case where a new user utterance has been input, the flow proceeds to step S204.

(Step S204)

In step S204, the speech recognition process on the user utterance having been newly input is performed.

This process is performed in the speech recognition unit 161 of the input data analysis unit 160 illustrated in FIG. 4.

The result of the speech recognition of the user utterance which has been performed in the speech recognition unit 161 is input to the limited utterance determination unit 171 of the process control unit 170.

(Step S205)

The process in step S205 is a process performed by the limited utterance determination unit 171 of the process control unit 170.

Upon input of text data having been generated in the speech recognition unit 161, the limited utterance determination unit 171 determines whether or not the user utterance is a limited utterance among the one or more pre-registered limited utterances. Specifically, it is determined whether or not the user utterance is an utterance registered in the limited utterance information DB 175.

In the case where it has been determined that the user utterance is a limited utterance registered in the limited utterance information DB 175, the flow proceeds to step S206.

In contrast, in the case where it has been determined that the user utterance is an unlimited utterance that is not registered in the limited utterance information DB 175, the flow proceeds to step S207.

(Step S206)

In the case where it has been determined in step S205 that the user utterance is a limited utterance registered in the limited utterance information DB 175, a process corresponding to the user utterance is performed in step S206.

The process execution unit 173 performs a process associated with a user utterance text that is the result of the speech recognition. Note that processes that are to be performed with respect to texts that match with limited utterances are stored in the application/response/alert/guidance information DB 177.

(Step S207)

In contrast, in the case where it has been determined in step S205 that the user utterance is not any one of the limited utterances registered in the limited utterance information DB 175, the meaning analysis process on the user utterance is performed in step S207.

Thereafter, the flow returns to step S107 of the flow illustrated in FIG. 11, and the risk determination process and the processes subsequent thereto are performed.

Performing the processing according to this flow prevents erroneous performance of a high-risk process unintended by a user.

In order to allow the high-risk process to be performed, the user needs to make a limited utterance.

Next, processing in the case where it has been determined in step S108 of the flow illustrated in FIG. 11 that the risk of the process corresponding to the intention of the user utterance is the medium-risk process will be described with reference to a flowchart illustrated in FIG. 13.

Figure 13:
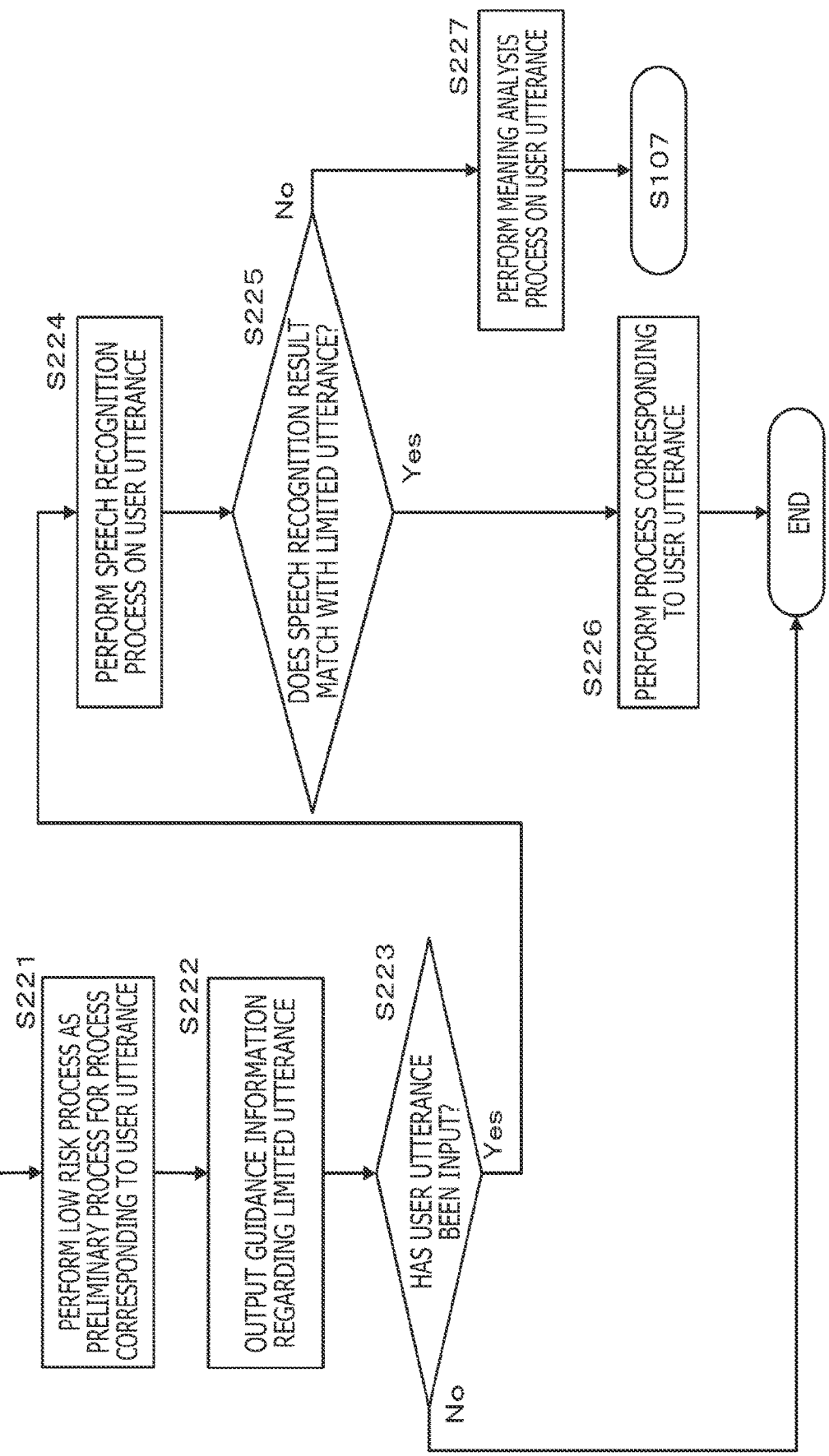
FIG. 13 is a diagram illustrating a flowchart that describes a sequence of processes performed by the information processing device of the present disclosure.

Processes in steps S221 to S227 of the flow illustrated in FIG. 13 are substantially similar to the processes in steps S201 to S207 of the flow corresponding to the high-risk process and having been described with reference to FIG. 12.

Only the process in step S221 and the process in step S201 are different, and the processes in steps S222 to S227 and the processes in steps S202 to S207 are the same processes.

The process in step S221, which is the different process, will be described.
(Step S221)

In the case where the risk determination unit 172 has determined that the process corresponding to the intention of the user utterance is the medium-risk process, first, in step S221, the process execution unit 173 performs a preliminary low-risk process associated with a process corresponding to the user utterance.

This is, for example, the process that has been described above with reference to FIG. 9 and that displays photographs having been taken in the past on the display unit of the information processing device 10, or any other similar process.

Displaying photograph information is a low-risk process and is a process associated with the user utterance=taking a photograph. In association with this process, guidance information regarding a limited utterance is output in step S222.

As a result of this display, in the case where the user actually wants to take a photograph, the user is only required to make a limited utterance following the guidance information.

In contrast, in the case where the user has no intention of taking a photograph, it is sufficient if the user does not make the limited utterance following the guidance information.

Note that the flow having been described with reference to FIG. 12 and used in the execution in the case where the process corresponding to the user utterance is the high-risk process is configured not to perform the process in step S221 illustrated in FIG. 13, that is, the process of performing a low-risk process associated with a process corresponding to the user utterance, but may be configured to perform the low-risk process associated with a process corresponding to the user utterance even in the case where the process corresponding to the user utterance is the high-risk process.

Further, even in the case where the process corresponding to the user utterance is the medium-risk process, the configuration may be made such that the process of outputting an alert is performed, which is performed in the high-risk processing.

[6. Regarding a Learning Process Performed by the Learning Process Execution Unit]

Next, a learning process performed by the learning process execution unit 174 implemented inside the process control unit 170 of the information processing device 10 illustrated in FIG. 4 will be described.

The learning process execution unit 174 updates registered data of the limited utterance information DB 175, by means of its learning process. That is, the learning process execution unit 174 performs, for example, a process of registering new limited utterance information, and the like.

Figure 14:
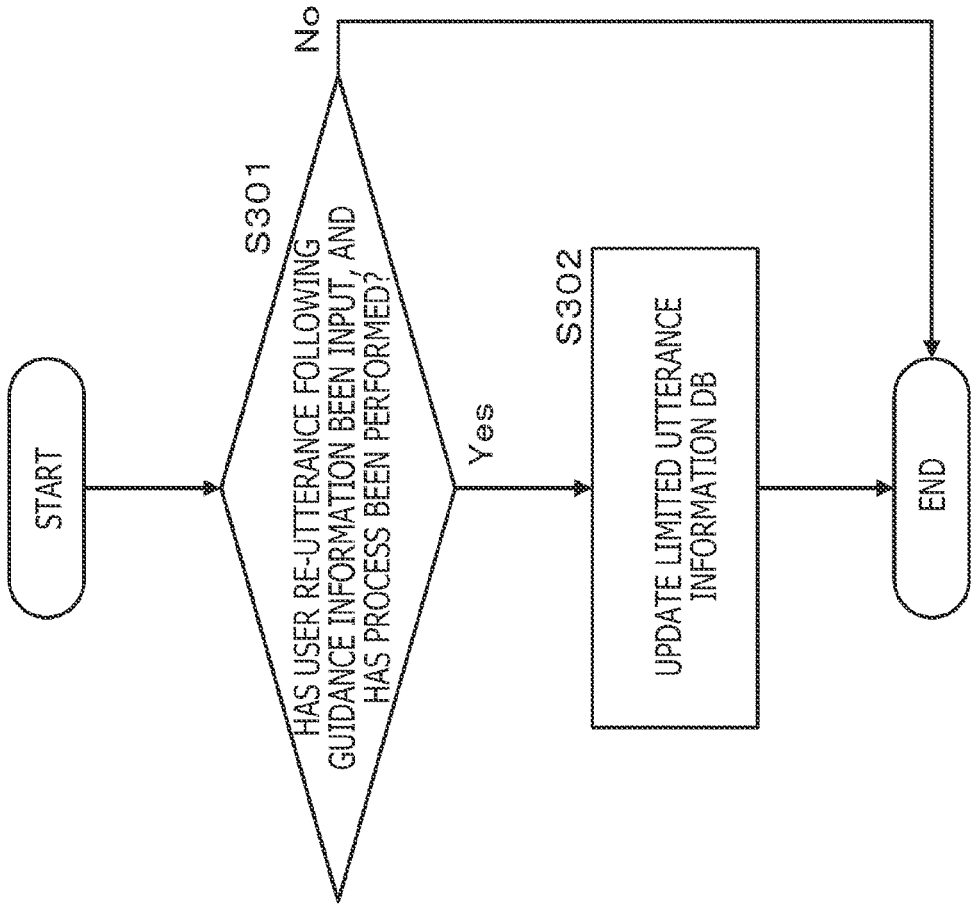
FIG. 14 is a diagram illustrating a flowchart that describes a sequence of processes performed by the information processing device of the present disclosure.

FIG. 14 is a flowchart that describes a sequence of the updating process, performed in the learning process that the learning process execution unit 174 performs, for updating registered data of the limited utterance information DB 175.

Processes in individual steps of the flow illustrated in FIG. 14 will be described.
(Step S301)

In step S301, the learning process execution unit 174 determines whether or not a user re-utterance following guidance information has been input and a process according to the re-utterance has been performed.

In the case where the process according to the re-utterance has been performed, the flow proceeds to step S302, and in the case where the process according to the re-utterance has not been performed, the flow is terminated.

Here, the user re-utterance following the guidance information is a limited utterance registered in the limited utterance information DB 175.

The fact that the guidance information has been output means that, prior to the output of the guidance information, the user has already made an unlimited utterance that is not registered in the limited utterance information DB 175.

In the case where it is determined in step S301 that the user re-utterance following the guidance information has been input and the process according to the re-utterance has been performed, the following presumption can be made.

That is, the user is presumed to have made the preceding unlimited utterance with the same intention as that for a limited utterance registered in the limited utterance information DB 175.
(Step S302)

In step S302, the learning process execution unit 174 performs, according to the above presumption, a database updating process of newly registering the unlimited utterance which has been made by the user prior to the output of the guidance information into the limited utterance information DB 175, as a new limited utterance.

This is a process based on the determination that the unlimited utterance having been made by the user prior to the output of the guidance information has been made by the user with the same intention as that for a limited utterance registered in the limited utterance information DB 175.

Figure 15:
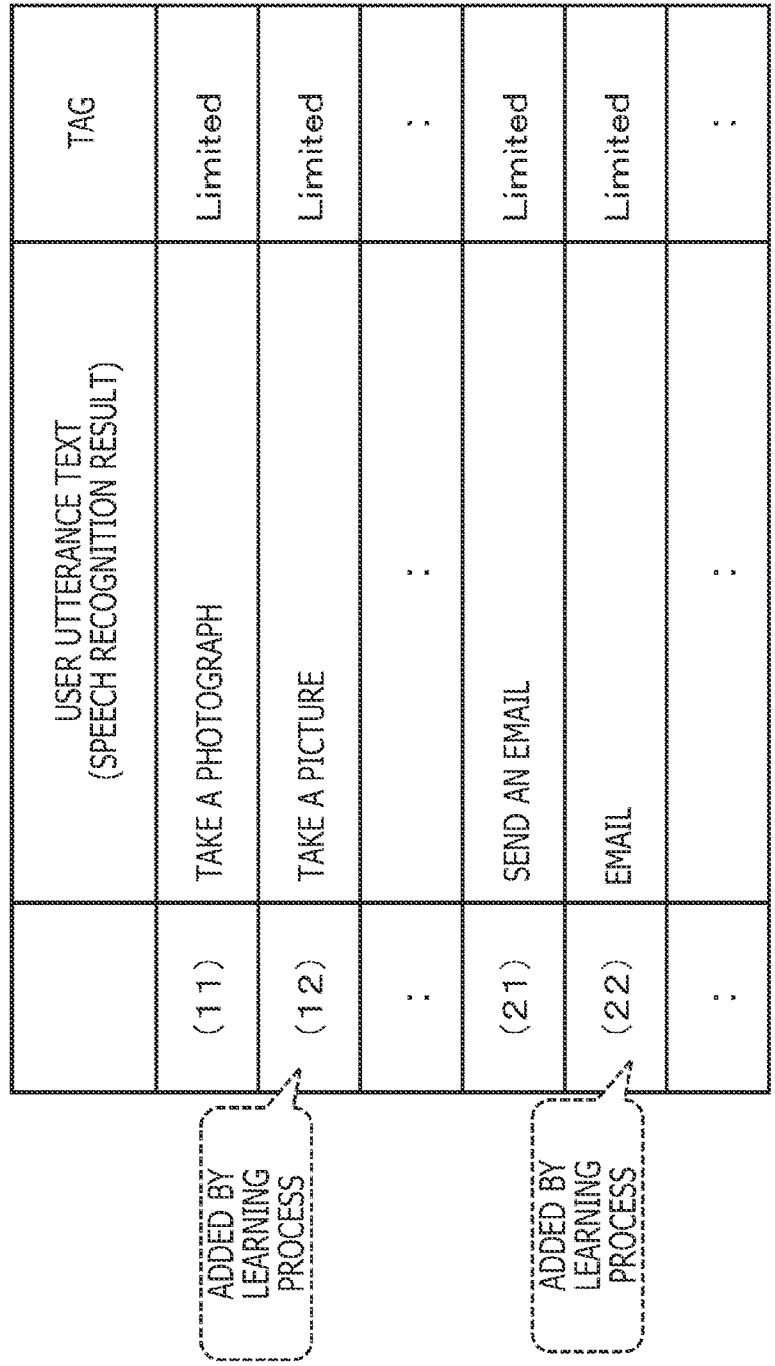
FIG. 15 is a diagram that describes an example of storage data of the limited utterance information database.

On the basis of such learning, the registered data of the limited utterance information DB 175 is sequentially updated For example, as illustrated in FIG. 15, pieces of new limited utterance data are additionally registered as pieces of new registered data of the limited utterance information DB 175.

After the limited utterance information DB 175 has been updated as illustrated in FIG. 15, in the case where, for example, a user has made an utterance "Take a photograph," this utterance is recognized as a limited utterance, and a process is instantly performed on the basis of the result of the speech recognition.

Note that the learning process may be configured to generate and register data as learned data for each person or for each family, for example.

For example, in the case where user identification is made from an image captured by a camera and an utterance specific to the identified user is confirmed, the utterance is registered as a limited utterance specific to the user.

Further, for example, a configuration may be employed in which a database updating process is performed for registering, into the limited utterance information DB 175, one or more limited utterances for each group of a plurality of users defined according to a user attribute such as family, gender, age, or context.

FIG. 16 illustrates an example of registered data of the limited utterance information DB 175 in which identifiers of users are added and limited utterances corresponding to the users are registered.

For example, entries (12) and (22) are pieces of registered limited utterance data corresponding to specific users and having been added by the learning process involving user identification.

These pieces of registered limited utterance data corresponding to the specific users are processed as limited utterances only in the case where utterances are from the specific users.

[7. Regarding Other Examples of Processing and Functions Performed by the Information Processing Device]

Heretofore, a basic embodiment performed by the information processing device 10 of the present disclose has been described. Hereinafter, other examples of processing and functions performed by the information processing device 10 of the present disclosure will be described.

In the above-described embodiment, the information processing device 10 has been described as an example in which its processing is performed on only user utterances, i.e., speech information, but the information processing device 10 may be configured to perform the processing in such a way as to confirm the intention of a user, for example, whether or not the user actually wants photographing, on the basis of data other than the speech, that is, any one of various kinds of input information such as user's gesture that is input through a camera, tapping operation onto a display screen, and a switching operation.

Further, although, in the above-described embodiment, the risk levels have been described as fixed data recorded in the risk determination information DB 176 having been described with reference to FIG. 6, the configuration may be made such that the risk levels are changed according to situations. For example, the configuration may be made such that the risk levels can be updated and changed according to an instruction from a user or the history of processes by the user. Further, there are some processes that a user intends to forcibly perform in an emergency situation, and the configuration may be made such that the risk determination function is canceled in such case.

Further, the configuration may be made such that the risk levels are dynamically changed according to the context of conversation. For example, the configuration may be made such that the risk determination is made by applying risk setting data that differs according to conditions such as a time zone, user's gender, and user's age. Further, the configuration may be made such that risk determination modes are changed according to the rise and fall, the sound pressure, and/or the like of the voice of a user. For example, such a setting is made that, when a user is raising his or her voice, a possibility that the user is uttering a command is high, and thus, the processing is performed without the execution of the risk determination.

Further, the configuration may be made such that an indicator or the like presents, to a user, the result of the risk determination having been made by the risk determination unit 172 of the information processing device.

[8. Regarding Configuration Examples of the Information Processing Device and the Information Processing System]

A plurality of the embodiments has been described so far, and the above-described various process functions in these embodiments, for example, the process functions of the individual components of the information processing device 10 illustrated in FIG. 4, can be implemented in whole inside one device such as agent equipment, a smartphone, or a PC owned by a user, but the configuration can also be made such that partial functions thereof are performed in a server or the like.

FIGS. 17A and 17B illustrate system configuration examples.

An information processing system configuration example 1 in FIG. 17A is an example in which almost all of the functions of the information processing device illustrated in FIG. 4 are implemented inside one device, i.e., an information processing device 410 that is a user terminal, such as a smartphone, a PC, or agent equipment having the functions of inputting/outputting speeches and inputting/outputting images, owned by a user.

The information processing device 410 corresponding to a user terminal performs communication with an application execution server 420 only in the case of, for example, the use of an external application at the time of making a response to a user.

The application execution server 420 is, for example, a weather information providing server, a traffic information providing server, a medical information providing server, a sightseeing information providing server, or the like, and is configured by a server capable of providing information for generating responses to user utterances, or the like.

On the other hand, an information processing system configuration example 2 in FIG. 17B is a system example in which partial functions of the information processing device illustrated in FIG. 4 are implemented inside the information processing device 410 that is a user terminal such as a smartphone, a PC, or agent equipment owned by a user and another partial functions thereof are performed in a data process server 460 capable of communicating with the information processing device.

For example, such a configuration that only the input unit 110 and the output unit 120 inside the device illustrated in FIG. 4 are provided at the side of the information processing device 410 on the user terminal side and that the other functions are in whole performed at the server side, or any other similar configuration can be employed.

Specifically, for example, such a configuration as described below can be employed.

In an information processing system including a user terminal and a data process server, the user terminal includes a speech input unit to which a user utterance is input and a speech output unit that outputs a system utterance generated by the data process server, whereas the data process server includes a limited utterance determination unit that determines whether or not the user utterance is a limited utterance among one or more pre-registered limited utterances and a risk determination unit that, in the case where the user utterance is not any one of the limited utterances, determines a risk of a process corresponding to the user utterance, and the data process server outputs a guidance that prompts a user to make a limited utterance among the one or more pre-registered limited utterances in the case where the risk of the process corresponding to the user utterance is not a low risk. For example, such a configuration as described above can be employed.

Note that, for function separation modes for functions at the user terminal side and functions at the server side, various different settings can be made, and further, a configuration can also be employed in which one function is performed at both of the sides.

[9. Regarding a configuration example of hardware of the information processing device]

Next, a configuration example of hardware of the information processing device will be described with reference to FIG. 18.

Figure 18:
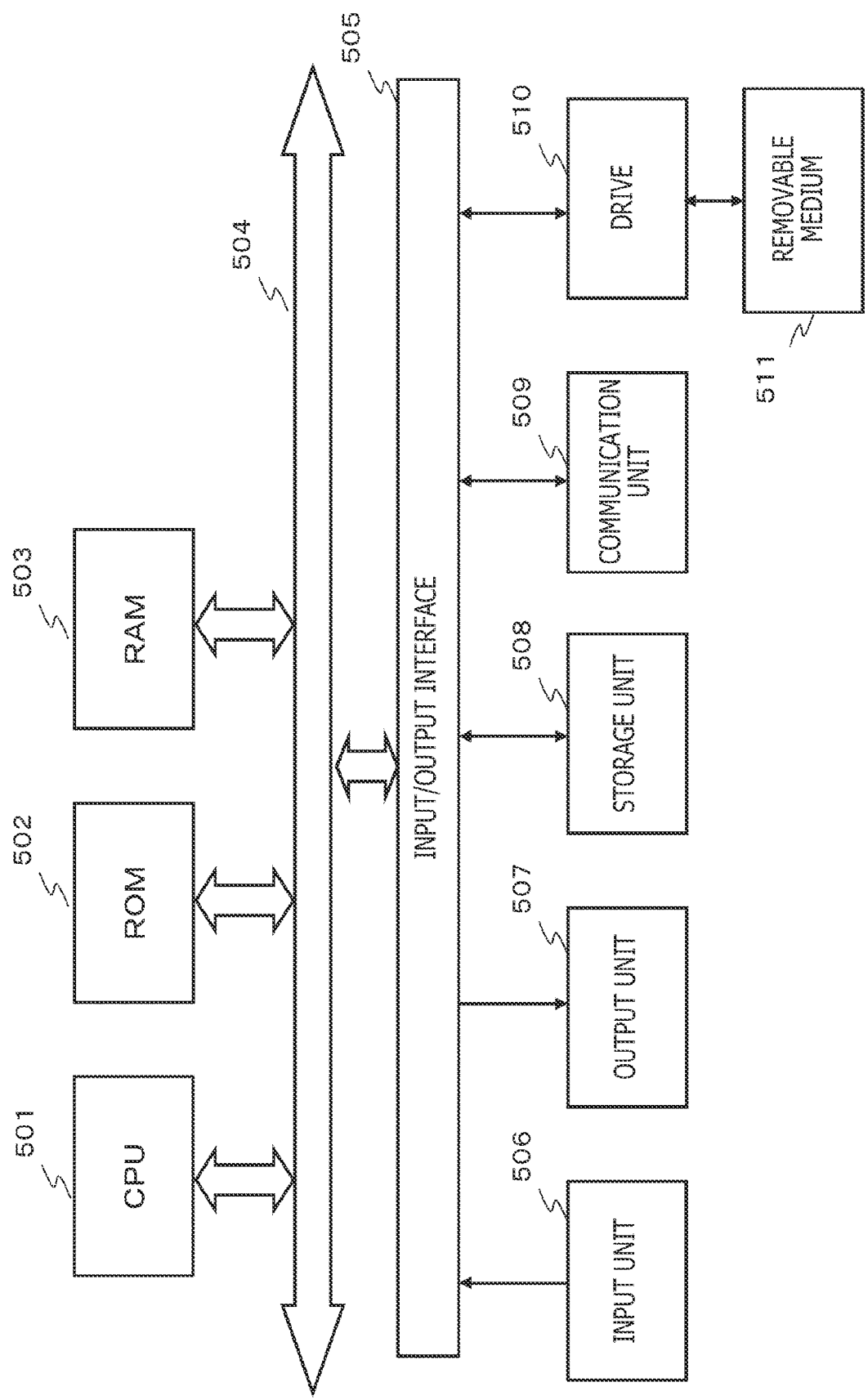
FIG. 18 is a diagram that describes a configuration example of hardware of the information processing device.

Hardware described herein with reference to FIG. 18 is a configuration example of hardware of the information processing device having been described above with reference to FIG. 4, and is further a configuration example of hardware of an information processing device that implements the data process server 460 having been described with reference to FIGS. 17A and 17B.

A CPU (Central Processing Unit) 501 functions as a control unit or a data process unit that performs various processes according to a program stored in a ROM (Read Only Memory) 502 or a storage unit 508. For example, the CPU 501 performs processing according to the sequence having been described in the above-mentioned embodiment. A RAM (Random Access Memory) 503 stores therein the program and data that are executed by the CPU 501. The CPU 501, the ROM 502, and the RAM 503 are coupled to one another via a bus 504.

The CPU 501 is coupled to an input/output interface 505 via the bus 504, and the input/output interface 505 is coupled to an input unit 506 including various kinds of switches, a keyboard, a mouse device, a microphone, a senser, and the like and an output unit 507 including a display, a speaker, and the like. The CPU 501 performs various processes in response to instructions input from the input unit 506 and outputs the results of the processes to, for example, the output unit 507.

The storage unit 508 coupled to the input/output interface 505 includes, for example, a hard disk or the like, and stores therein the program and various kinds of data that are executed by the CPU 501. A communication unit 509 functions as a transmitting/receiving unit for Wi-Fi communication, Bluetooth (registered trademark) (BT) communication, and any other data communication via a network, such as the Internet or a local area network, and communicates with external devices.

A drive 510 coupled to the input/output interface 505 drives a removable medium 511, such as a magnetic disk, an optical disk, a magneto-optical disk, or a semiconductor memory such as a memory card, and performs recording/reading of data.

[10. Summary of the Configuration of the Present Disclosure]

Heretofore, the embodiments of the present disclosure have been described in detail referring to a specific embodiment. However, it is obvious that those skilled in the art may make modifications and substitutions of the embodiments within the scope not departing from the gist of the present disclosure. That is, the present invention has been disclosed in the form of an example and should not be interpreted in a limited manner. In order to make a determination on the gist of the present disclosure, the section of the claims should be taken into consideration.

Note that the technology disclosed in the present description can have the following configurations.

(1)

An information processing device including:

a limited utterance determination unit that determines whether or not a user utterance is a limited utterance among one or more pre-registered limited utterances;

a risk determination unit that, in a case where a result of the determination is that the user utterance is not any one of the one or more pre-registered limited utterances, determines a risk of a process corresponding to the user utterance; and a process execution unit that, in a case where the risk of the process corresponding to the user utterance is not a low risk, outputs a guidance that prompts a user to make a limited utterance among the one or more pre-registered limited utterances.

(2)

The information processing device according to (1), in which the process execution unit further outputs an alert in the case where the risk of the process corresponding to the user utterance is not the low risk.

(3)

The information processing device according to (2), in which the alert includes explanation information regarding the risk of the process corresponding to the user utterance.

(4)

The information processing device according to any one of (1) to (3), in which the process execution unit further performs a low-risk process associated with the process corresponding to the user utterance, in the case where the risk of the process corresponding to the user utterance is not the low risk.

(5)

The information processing device according to any one of (1) to (4), in which, in a case where the limited utterance determination unit determines that the user utterance is the limited utterance, the process execution unit performs the process corresponding to the user utterance.

(6)

The information processing device according to any one of (1) to (5), in which, in a case where the limited utterance determination unit determines that the user utterance is the limited utterance, the process execution unit does not acquire a result of a meaning analysis of the user utterance but performs a process corresponding to the user utterance.

(7)

The information processing device according to any one of (1) to (6), further including:

a speech recognition unit that performs speech recognition on the user utterance, in which the limited utterance determination unit determines whether or not the user utterance is the limited utterance among the one or more pre-registered limited utterances, on the basis of text data generated in the speech recognition unit.

(8)

The information processing device according to (7), in which the process execution unit performs a process associated with the text data generated in the speech recognition unit.

(9)

The information processing device according to any one of (1) to (8), further including:

a learning process execution unit that performs a process of updating a limited utterance information database in which one or more limited utterances are registered.

(10)

The information processing device according to (9), in which, in a case where the user has made the limited utterance following the guidance that has been output by the process execution unit and that prompts the limited utterance, the learning process execution unit performs a database updating process of registering, into the limited utterance information database, an unlimited utterance made by the user prior to the output of the guidance, as a new limited utterance.

(11)

The information processing device according to (9) or (10), in which the learning process execution unit performs a database updating process of registering, into the limited utterance information database, a user-specific limited utterance.

(12)

The information processing device according to any one of (9) to (11), in which the learning process execution unit performs a database updating process of registering, into the limited utterance information database, one or more limited utterances for each group of a plurality of users defined according to a user attribute.

(13)

The information processing device according to (12), in which the user attribute is at least any one of family, gender, age, or context.

(14)

An information processing system including:
a user terminal; and
a data process server,
in which the user terminal includes
a speech input unit to which a user utterance is input, and
a speech output unit that outputs a system utterance generated by the data process server,
the data process server includes
a limited utterance determination unit that determines whether or not the user utterance is a limited utterance among one or more pre-registered limited utterances, and
a risk determination unit that, in a case where a result of the determination is that the user utterance is not any one of the one or more pre-registered limited utterances, determines a risk of a process corresponding to the user utterance, and
the data process server outputs, to the user terminal, a guidance that prompts a user to make a limited utterance among the one or more pre-registered limited utterances, in a case where the risk of the process corresponding to the user utterance is not a low risk.

(15)

The information processing system according to (12), in which, in the case where the risk of the process corresponding to the user utterance is not the low risk, the process execution unit of the data process server further outputs, to the user terminal, an alert including explanation information regarding the risk of the process corresponding to the user utterance.

(16)

An information processing method performed in an information processing device, the method including:
a limited utterance determination step of causing a limited utterance determination unit to determine whether or not a user utterance is a limited utterance among one or more pre-registered limited utterances;
a risk determination step of, in a case where a result of the determination is that the user utterance is not any one of the one or more pre-registered limited utterances, causing a risk determination unit to determine a risk of a process corresponding to the user utterance; and
a process execution step of, in a case where the risk of the process corresponding to the user utterance is not a low risk, causing a process execution unit to output a guidance that prompts a user to make a limited utterance among the one or more pre-registered limited utterances.

(17)

An information processing method performed in an information processing system including a user terminal and a data process server, the method including:
causing the user terminal to receive an input of a user utterance through a speech input unit and transmit the user utterance to the data process server; and
causing the data process server to perform
a limited utterance determination process of determining whether or not the user utterance is a limited utterance among one or more pre-registered limited utterances,
a risk determination process of, in a case where a result of the determination is that the user utterance is not any one of the one or more pre-registered limited utterances, determining a risk of a process corresponding to the user utterance, and
a process of, in a case where the risk of the process corresponding to the user utterance is not a low risk, outputting, to the user terminal, a guidance that prompts a user to make a limited utterance among the one or more pre-registered limited utterances.

(18)

A program for causing information processing to be performed in an information processing device, the information processing including:
a limited utterance determination step of causing a limited utterance determination unit to determine whether or not a user utterance is a limited utterance among one or more pre-registered limited utterances;
a risk determination step of, in a case where a result of the determination is that the user utterance is not any one of the one or more pre-registered limited utterances, causing a risk determination unit to determine a risk of a process corresponding to the user utterance; and
a process execution step of, in a case where the risk of the process corresponding to the user utterance is not a low risk, causing a process execution unit to output a guidance that prompts a user to make a limited utterance among the one or more pre-registered limited utterances.

Further, the series of processing having been described in the present description can be performed by hardware, software, or a composite configuration of the hardware and the software. In the case where the processing is performed by the software, a method of installing a program that records therein the sequence of the processing into a memory inside a computer incorporated in dedicated hardware and executing the program or a method of installing the program into a general-purpose computer capable of executing various processes and executing the program can be employed. For example, the program can be recorded in advance in a recording medium. In addition to a method of installing the program into a computer from the recording medium, a method of receiving the program via a network such as the Internet or a LAN (Local Area Network) and installing the program into an incorporated recording medium such as a hard disk can be employed.

Note that the various kinds of processing described in the present description are not only performed in chronological order according to the description, but may also be performed in parallel or in a separate manner as needed or according to the throughput of a device that performs the kinds of processing. Further, the system in the present description is a plurality of logical set constructions of devices, and the devices of each construction are not necessarily inside the same housing.

INDUSTRIAL APPLICABILITY

As described above, the configuration of an embodiment of the present disclosure achieves a configuration that reduces false operation by means of the process control that takes into account a risk caused by a process corresponding to a user utterance and the display of an utterance guidance.

Specifically, for example, a limited utterance determination unit that determines whether or not a user utterance is a limited utterance among one or more pre-registered limited utterances; a risk determination unit that, in the case where the result of the determination is that the user utterance is not any one of the one or more pre-registered limited utterances, determines the risk of a process corresponding to the user utterance; and a process execution unit that, in the case where the risk of the process corresponding to the user utterance is not a low risk, outputs a guidance that prompts the user to make a limited utterance included in the pre-registered limited utterances are provided. In the case where the risk is not the low risk, the process execution unit outputs an alert including explanation information regarding the risk. Further, in the case where the user utterance is the limited utterance, the process execution unit does not acquire the result of the meaning analysis of the user utterance but performs a process corresponding to the user utterance.

This configuration achieves the above-described configuration which reduces false operation by means of the process control that takes into account a risk caused by a process corresponding to a user utterance and the display of an utterance guidance.

REFERENCE SIGNS LIST

10 Information processing device
11 Camera
12 Microphone
13 Display unit
14 Speaker
20 Server
30 External equipment
110 Input unit
111 Speech input unit
112 Image input unit
120 Output unit
121 Speech output unit
122 Image output unit
150 Data process unit
160 Input data analysis unit
161 Speech recognition unit
162 Utterance meaning analysis unit
170 Process control unit
171 Limited utterance determination unit
172 Risk determination unit
173 Process execution unit
174 Leaning process execution unit
175 Limited utterance information DB
176 Risk determination information DB
177 Application/response/alert/guidance information DB
180 Output control unit
181 Output speech control unit
182 Display information control unit
410 Information processing device
420 Application execution server
460 Data process server
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An information processing device, comprising:
at least one processor configured to:
determine whether a user utterance is a limited utterance among a plurality of limited utterances, wherein the plurality of limited utterances are registered in a limited utterance information database;
determine, based on a result of the determination that the user utterance is not the limited utterance among the plurality of limited utterances, a level of risk of an execution of a process corresponding to the user utterance;
determine whether the level, of the risk of the execution of the process, corresponds to at least one stage of risk, wherein
the at least one stage of risk is one of a low risk stage, a medium risk stage, or a high risk stage,
a risk level of the medium risk stage is higher than a risk level of the low risk stage, and
a risk level of the high risk stage is higher than the risk level of the medium risk stage; and
output, based on the determination that the level of the risk of the execution of the process not being the low risk stage, a guidance that prompts a user to make the limited utterance among the plurality of limited utterances.

2. The information processing device according to claim 1, wherein the at least one processor is further configured to output an alert based on the determination that the level of the risk of the execution of the process corresponding to the user utterance is not the low risk stage.

3. The information processing device according to claim 2, wherein the alert includes explanation information associated with the level of risk of the execution of the process corresponding to the user utterance.

4. The information processing device according to claim 1, wherein the at least one processor is further configured to execute a low-risk process associated with the process corresponding to the user utterance, based on the determination that the level of the risk of the process corresponding to the user utterance is not the low risk stage.

5. The information processing device according to claim 1, wherein, the at least one processor is further configured to execute the process corresponding to the user utterance based on the determination that the user utterance is the limited utterance.

6. The information processing device according to claim 1, wherein the at least one processor is further configured to:
not acquire a result of a meaning analysis of the user utterance based on the determination that the user utterance is the limited utterance, and
execute the process corresponding to the user utterance based on the determination that the user utterance is the limited utterance.

7. The information processing device according to claim 1, wherein the at least one processor is further configured to:
perform speech recognition on the user utterance,
determine whether the user utterance is the limited utterance among the plurality of limited utterances based on text data generated by the speech recognition.

8. The information processing device according to claim 7, wherein the at least one processor is further configured to execute a process associated with the text data generated by the speech recognition.

9. The information processing device according to claim 1, wherein the at least one processor is further configured to:

execute a process of updating the limited utterance information database in which the plurality of limited utterances are registered.

10. The information processing device according to claim 9, wherein,
in a case where the user has made the limited utterance following the outputted guidance that prompts the limited utterance, the at least one processor is further configured to execute a database updating process of registering, into the limited utterance information database, an unlimited utterance made by the user prior to the output of the guidance, and
the unlimited utterance is registered as a new limited utterance.

11. The information processing device according to claim 9, wherein the at least one processor is further configured to execute a database updating process of registering, into the limited utterance information database, a user-specific limited utterance.

12. The information processing device according to claim 9, wherein the at least one processor is further configured to execute a database updating process of registering, into the limited utterance information database, a set of limited utterances for each group of a plurality of users defined according to a user attribute.

13. The information processing device according to claim 12, wherein the user attribute is at least one of a family, a gender, an age, or a context.

14. An information processing system, comprising:
a user terminal, and
a data process server, wherein
the user terminal includes
a microphone to which a user utterance is input, and
a speaker configured to output a system utterance generated by the data process server,
the data process server includes
at least one processor configured to:
determine whether the user utterance is a limited utterance among a plurality of limited utterances, wherein the plurality of limited utterances are registered in a limited utterance information database;
determine, based on a result of the determination that the user utterance is not the limited utterance among the plurality of limited utterances, a level of risk of an execution of a process corresponding to the user utterance,
determine whether the level, of the risk of the execution of the process, corresponds to at least one stage of risk, wherein
the at least one stage of risk is one of a low risk stage, a medium risk stage, or a high risk stage,
a risk level of the medium risk stage is higher than a risk level of the low risk stage, and
a risk level of the high risk stage is higher than the risk level of the medium risk stage; and
output, to the user terminal, a guidance that prompts a user to make the limited utterance among the plurality of limited utterances, based on the determination that the level of the risk of the execution of the process not being the low risk stage.

15. The information processing system according to claim 14, wherein,
the at least one processor is further configured to output, based on the determination that the level of the risk of the execution of the process corresponding to the user utterance is not the low risk stage, an alert to the user terminal,
the alert includes explanation information associated with the risk of the process corresponding to the user utterance.

16. An information processing method, comprising:
determining whether a user utterance is a limited utterance among a plurality of limited utterances, wherein the plurality of limited utterances are registered in a limited utterance information database;
determining, based on a result of the determination that the user utterance is not the limited utterance among the plurality of limited utterances, a level of risk of an execution of a process corresponding to the user utterance;
determining whether the level, of the risk of the execution of the process, corresponds to at least one stage of risk, wherein
the at least one stage of risk is one of a low risk stage, a medium risk stage, or a high risk stage,
a risk level of the medium risk stage is higher than a risk level of the low risk stage, and
a risk level of the high risk stage is higher than the risk level of the medium risk stage; and
outputting, based on the determination that the level of the risk of the execution of the process not being the low risk stage, a guidance that prompts a user to make the limited utterance among the plurality of limited utterances.

17. An information processing method performed in an information processing system including a user terminal and a data process server, the method comprising:
receiving, via the user terminal, an input of a user utterance;
transmitting the user utterance to the data process server;
determining, by the data process server, whether the user utterance is a limited utterance among a plurality of limited utterances, , wherein the plurality of limited utterances are registered in a limited utterance information database;
determining, based on a result of the determination that the user utterance is not the limited utterance among the plurality of limited utterances, a level of risk of an execution of a process corresponding to the user utterance;
determining whether the level, of the risk of the execution of the process, corresponds to at least one stage of risk, wherein
the at least one stage of risk is one of a low risk stage, a medium risk stage, or a high risk stage,
a risk level of the medium risk stage is higher than a risk level of the low risk stage, and
a risk level of the high risk stage is higher than the risk level of the medium risk stage; and
outputting, based on the determination that the level of the risk of the execution of the process not being the low risk stage, a guidance to the user terminal, wherein the guidance prompts a user to make the limited utterance among the plurality of limited utterances.

18. A non-transitory computer-readable medium having stored thereon, computer-executable instructions which, when executed by a computer, cause the computer to execute operations, the operations comprising:
determining whether a user utterance is a limited utterance among a plurality of limited utterances, wherein the plurality of limited utterances are registered in a limited utterance information database;

determining, based on a result of the determination that the user utterance is not the limited utterance among the plurality of limited utterances, a level of risk of an execution of a process corresponding to the user utterance;

determining whether the level, of the risk of the execution of the process, corresponds to at least one stage of risk, wherein the at least one stage of risk is one of a low risk stage, a medium risk stage, or a high risk stage, a risk level of the medium risk stage is higher than a risk level of the low risk stage, and a risk level of the high risk stage is higher than the risk level of the medium risk stage; and outputting, based on the determination that the level of the risk of the execution of the process not being the low risk stage, a guidance that prompts a user to make the limited utterance among the plurality of limited utterances.

* * * * *